United States Patent
Agudelo

(10) Patent No.: US 10,195,708 B2
(45) Date of Patent: Feb. 5, 2019

(54) METHOD AND APPARATUS FOR CENTRALIZED COMPLIANCE, OPERATIONS AND SETUP OF AUTOMATED CUTTING TOOL MACHINES

(71) Applicant: The Boeing Company, Chicago, IL (US)

(72) Inventor: Richard Agudelo, Mount Pleasant, SC (US)

(73) Assignee: THE BOEING COMPANY, Chicago, IL (US)

(*) Notice: Subject to any disclaimer, the term of this patent is extended or adjusted under 35 U.S.C. 154(b) by 54 days.

(21) Appl. No.: 15/398,561

(22) Filed: Jan. 4, 2017

(65) Prior Publication Data

US 2018/0085877 A1     Mar. 29, 2018

Related U.S. Application Data

(60) Provisional application No. 62/401,108, filed on Sep. 28, 2016.

(51) Int. Cl.
| | |
|---|---|
| G05B 23/00 | (2006.01) |
| G05B 19/00 | (2006.01) |
| B23Q 17/09 | (2006.01) |
| G05B 23/02 | (2006.01) |
| G05B 19/048 | (2006.01) |

(52) U.S. Cl.
CPC ....... *B23Q 17/0995* (2013.01); *G05B 19/048* (2013.01); *G05B 23/0275* (2013.01); *G05B 23/0283* (2013.01); *G05B 2219/45044* (2013.01)

(58) Field of Classification Search
CPC ...... G05B 23/0283; G05B 2219/36291; G05B 2219/36347; G05B 2219/37252; G05B 2219/50185
See application file for complete search history.

(56) References Cited

U.S. PATENT DOCUMENTS

| | | | | | |
|---|---|---|---|---|---|
| 4,563,897 | A | * | 1/1986 | Moore | G01N 3/58 700/175 |
| 4,608,644 | A | * | 8/1986 | Kiya | G05B 19/4065 483/4 |
| 4,694,686 | A | * | 9/1987 | Fildes | G05B 19/4065 324/71.1 |
| 5,571,957 | A | * | 11/1996 | Tanaka | G05B 19/4065 73/104 |
| 5,689,062 | A | * | 11/1997 | Jawahir | G01N 3/58 700/175 |

(Continued)

*Primary Examiner* — Ronald D Hartman, Jr.
(74) *Attorney, Agent, or Firm* — Gates & Cooper LLP

(57) ABSTRACT

A system and method for cutting at least one of a plurality of features in a workpiece with at least one of a plurality of cutting tools controlled by at least one of a plurality of cutting tool machines is disclosed. The method receives process information describing cutting parameters from cutting tool machines, retrieves predicted cutting tool wear information relating a predicted cutting tool wear value to the cutting parameters, retrieves cutting tool information that include measured cutting tool wear information for the one of the plurality of cutting tools, computes a predicted cutting tool wear value for the one of the plurality of cutting tools from the measured cutting tool wear information, and cuts the at least one feature according to the computed predicted cutter wear value.

19 Claims, 19 Drawing Sheets

(56) References Cited

U.S. PATENT DOCUMENTS

| | | | | |
|---|---|---|---|---|
| 6,161,055 A * | 12/2000 | Pryor | ................ | G05B 19/4065 |
| | | | | 382/152 |
| 6,308,138 B1 * | 10/2001 | Jones | ................ | G05B 19/4065 |
| | | | | 700/174 |
| 6,384,560 B1 * | 5/2002 | Kakino | ................ | G05B 19/404 |
| | | | | 318/433 |
| 6,584,415 B1 * | 6/2003 | Uneme | ............. | G05B 19/4065 |
| | | | | 702/33 |
| 9,665,085 B2 * | 5/2017 | Kawashima | ..... | G05B 19/40937 |
| 2006/0251484 A1 * | 11/2006 | Yoshida | ................ | B23Q 15/16 |
| | | | | 409/131 |
| 2012/0163930 A1 * | 6/2012 | Jeyaraman | ......... | G05B 19/4065 |
| | | | | 408/8 |
| 2014/0200709 A1 * | 7/2014 | Utsumi | ............. | G05B 19/4065 |
| | | | | 700/175 |
| 2014/0358274 A1 * | 12/2014 | Matsuo | ............. | G05B 19/4065 |
| | | | | 700/175 |
| 2015/0142154 A1 * | 5/2015 | Tiano | ................ | G05B 19/4065 |
| | | | | 700/109 |
| 2015/0293523 A1 * | 10/2015 | Yamamoto | ......... | G05B 19/4065 |
| | | | | 700/175 |
| 2016/0091393 A1 * | 3/2016 | Liao | ................... | B23Q 17/0995 |
| | | | | 702/34 |
| 2016/0363925 A1 * | 12/2016 | Oohashi | ............ | G05B 19/4065 |
| 2018/0085878 A1 * | 3/2018 | Agudelo | ............ | B23Q 17/0995 |

* cited by examiner

| Kit # | Tool | Dkam | Serial Number | Date Completed | Initial Tool Life | Tool Life Now | Added By | Tag # | |
|---|---|---|---|---|---|---|---|---|---|
| (1) | 5 | 0.2500 | | | | | | | |
| (2) | 5 | 0.2500 | | | | | | | |
| (3) | 5 | 0.2500 | | | | | | | |
| (4) | 5 | 0.2500 | | | | | | | |
| (5) | (5) | 0.2500 | ts298254 | 11/4/2015 12:04:53 AM | 0.0000% | 0.0000% | | | |
| (6) | 47T | 0.2500 | 1131533 | 11/4/2015 12:00:28 AM | 0.0000% | 0.0000% | | | ✕ |
| (7) | 47T | 0.2500 | 3880604S | 9/10/2015 9:38:01 AM | 22.4872% | 22.4872% | | | ✕ |
| (8) | 47T | 0.2500 | 3783459 | 10/26/2015 7:54:40 PM | 0.0000% | 0.0000% | | | ✕ |
| (9) | 47T | 0.2500 | 39946010 | 10/23/2015 10:49:28 PM | 11.5182% | 11.5182% | 2526487 | 83893 | ✕ |
| (10) | 47T | 0.2500 | 50257081X | 11/2/2015 10:11:13 PM | 0.0000% | 0.0000% | 2526487 | 83892 | ✕ |
| (11) | 56T | 0.3125 | 41085-72 | 10/29/2015 1:30:10 AM | 29.3631% | 29.3631% | 2526487 | 87852 | ✕ |
| (12) | 56T | 0.3125 | 38673-029 | 10/26/2015 4:34:06 PM | 40.9066% | 40.9066% | 2526487 | 83847 | ✕ |
| (13) | 56T | 0.3125 | 53078270 | 11/4/2015 12:28:45 AM | 0.0000% | 0.0000% | 2526487 | 83427 | ✕ |
| (14) | 56T | 0.3125 | 1131541 | 11/4/2015 12:24:30 AM | 0.0000% | 0.0000% | 2526487 | 83571 | ✕ |
| (15) | 56T | 0.3125 | 1131542 | 11/4/2015 12:13:57 AM | 0.0000% | 0.0000% | 2526487 | 83223 | ✕ |
| (16) | 56T | 0.3125 | 53078235 | 11/4/2015 12:09:07 AM | 0.0000% | 0.0000% | 2526487 | 83503 | ✕ |
| (16) | 56T | 0.3750 | 41165-10 | 11/4/2015 1:05:39 AM | 0.0000% | 0.0000% | 2526487 | 83632 | ✕ |

FIG. 6

| | |
|---|---|
| Serial Number | 285 |
| Parlec Id | 1014150329 |
| Cutter Type | |
| Setup Date | 10/14/2015 3:29:14 AM |
| Holder | HSK-40 |
| Tool ID | 67S |
| Drill Diameter | 5.6849 |
| Overall Length | 4.75123 |
| Tip Length | 0.86486 |
| Countersink Start | 41252 |
| Countersink Radius | 3.4125 |
| Countersink Stop 1 | 2.1253 |
| Countersink Diameter 1 | 1.55123 |
| Countersink Stop 2 | 2.2136 |
| Countersink Diameter 2 | 1.56126 |
| Countersink Angle | 54.123 |
| Tool Life | 46.4992% |
| Setter Used | Parlec 2 |

706A – Serial Number
706B – Parlec Id
706C – Cutter Type
706D – Setup Date
706E – Holder
706F – Tool ID
706G – Drill Diameter
706H – Overall Length
706I – Tip Length
706J – Countersink Start
706K – Countersink Radius
706L – Countersink Stop 1
706M – Countersink Diameter 1
706N – Countersink Stop 2
706O – Countersink Diameter 2
706P – Countersink Angle
706Q – Tool Life
706R – Setter Used

706

Setup but not used yet

| Setup Cart | Parlec ID |
|---|---|
| 409 FT AFT (1209) | 1014150329 |

708

| Setup Cart | Parlec ID |
|---|---|
| 409 FT AFT (1209) | 1014150329 |
| 405 FT FWD (873) | 1014150329 |

710

| Setup Cart | Parlec ID |
|---|---|
| 405 | 1014150329 |

Serial Number: 285                                                                                                          Export To Excel

| Data | Ship | Hole ID | Expected/ Actual Stackup | Tool life | Max. Thrust | Process | Diameter | NC Program | Machine | Go to |
|---|---|---|---|---|---|---|---|---|---|---|
| 10/21/2015 4:23:21 AM | 405 | 1 | 4054125 | 0.1797 | 59.0000 | 75 | 0.37630 | //DATA_SV/BCFL_03-09 80-1006S01-11L_C02-VAE | FT 11 | Probe Data Drill Data More Info |
| 10/21/2015 4:23:43 AM | 405 | 2 | 5236452 | 0.3594 | 59.0000 | 75 | 0.37630 | //DATA_SV/BCFL_03-09 80-1006S01-11L_C02-VAE | FT 11 | Probe Data Drill Data More Info |
| 10/21/2015 4:23:56 AM | 405 | 3 | 521364 | 0.5391 | 58.0000 | 75 |  | //DATA_SV/BCFL_03-09 80-1006S01-11L_C02-VAE | FT 11 | Probe Data Drill Data More Info |
| 10/21/2015 4:24:40 AM | 405 | 4 | 846698 | 0.7187 | 62.0000 | 75 | 0.37630 | //DATA_SV/BCFL_03-09 80-1006S01-11L_C02-VAE | FT 11 | Probe Data Drill Data More Info |
| 10/21/2015 4:25:13 AM | 405 | 5 | 412563 | 0.8984 | 62.0000 | 75 | 0.37640 | //DATA_SV/BCFL_03-09 80-1006S01-11L_C02-VAE | FT 11 | Probe Data Drill Data More Info |
| 10/21/2015 4:25:42 AM | 405 | 6 | 874569 | 1.0781 | 60.0000 | 75 | 0.37680 | //DATA_SV/BCFL_03-09 80-1006S01-11L_C02-VAE | FT 11 | Probe Data Drill Data More Info |
| 10/21/2015 4:26:04 AM | 405 | 7 | 412563 | 1.2578 | 63.0000 | 75 |  | //DATA_SV/BCFL_03-09 80-1006S01-11L_C02-VAE | FT 11 | Probe Data Drill Data More Info |
| 10/21/2015 4:26:18 AM | 405 | 8 | 874123 | 1.4375 | 60.0000 | 75 |  | //DATA_SV/BCFL_03-09 80-1006S01-11L_C02-VAE | FT 11 | Probe Data Drill Data More Info |
| 10/21/2015 4:26:32 AM | 405 | 9 | 985632 | 1.6168 | 61.0000 | 75 | 0.37650 | //DATA_SV/BCFL_03-09 80-1006S01-11L_C02-VAE | FT 11 | Probe Data Drill Data More Info |
| 10/21/2015 4:27:14 AM | 405 | 10 | 741258 | 1.7961 | 59.0000 | 75 | 0.37630 | //DATA_SV/BCFL_03-09 80-1006S01-11L_C02-VAE | FT 11 | Probe Data Drill Data More Info |
| 10/21/2015 4:27:14 AM | 405 | 11 | 963258 | 1.9758 | 59.0000 | 75 | 0.37630 | //DATA_SV/BCFL_03-09 80-1006S01-11L_C02-VAE | FT 11 | Probe Data Drill Data More Info |

METHOD AND APPARATUS FOR CENTRALIZED COMPLIANCE, OPERATIONS AND SETUP OF AUTOMATED CUTTING TOOL MACHINES

CROSS-REFERENCE TO RELATED APPLICATIONS

This application claims benefit of U.S. Provisional Patent Application No. 62/401,108, entitled "METHOD AND APPARATUS FOR CENTRALIZING COMPLIANCE, OPERATIONS AND SETUP FOR AUTOMATED DRILLING MACHINES (COSA)," by Richard Agudelo, filed Sep. 28, 2016, which application is hereby incorporated by reference herein.

This application is related to the following co-pending and commonly assigned patent application(s), all of which applications are incorporated by reference herein:

Application Ser. No. 15/398,586, entitled "METHOD AND APPARATUS FOR MONITORING AUTOMATED DRILLING PROCESSES," by Richard Agudelo, filed on same date herewith.

BACKGROUND

1. Field

The present disclosure relates to systems and methods for operating automated cutting tool machines, and in particular, to a system and method for managing such automated cutting tool machines.

2. Description of the Related Art

Automated processes are advantageous in applications having repetitive or dangerous operations. Accordingly, some industries (notably automotive and aeronautical) have adopted the use of automated processes in many manufacturing operations. Among such automated processes are those which involve automated cutting tools, such as drills (hereinafter alternatively referred to as automated drillers). Such automated drillers include a computer or other processor that executes a numerical control (NC) program that commands the driller on how to drill each feature (e.g. hole). Current automated processes have particular disadvantages which must be addressed to minimize cost.

First, such automated drillers typically work independently, and are communicatively isolated from one another. Hence, data collected from the automated drillers is only available locally in the individual machines. Further, any automated equipment used to setup tools that are used on the automated driller do not communicate with the automated drillers, or each other, because these devices use different operating systems and controllers. Accordingly, it is not possible to track the usage, failure trends and current location of cutters (e.g. drills) used in the automated driller machines.

Second, cutting tools typically wear with each use, and therefore have a limited lifetime. Automated drillers do not allow prediction of cutter usage or allow cutter usage and wear trends to be identified. The accurate prediction of cutter wear or usage permits "just in time" manufacturing techniques (e.g. providing just the right number of cutters to the right automated driller when it is needed and not before or after) that save money, improve workplace safety, and the identification of wear trends can identify areas where cutter use can be optimized to reduce costs. For example, it is useful to determine how many cutters are needed in theory and compare those numbers with how many were actually used. If cutters are not being used to 100% of their life, it is advantageous to know how closely they are used to 100% of their life and to identify why they are not being used to 100% of their life.

Further, cutters are typically returned to vendors for sharpening, but after sharpening, vendors typically provide the cutters with same serial number. Since the cutters have the same serial number it is difficult to identify trends in cutter use and wear. A system that could identify cutters that have been re-sharpen would help on better understanding behavior of these cutters and drive cost reductions.

Third, the cutting processes implemented by the automated cutters is imperfect, with some holes being burnt or drilled to dimensions that are out of specification or close to it. Even so, it is difficult to identify which holes were burnt, which cutter was used to drill the burned hole, or to identify any trends that might shed light on why such burnt holes are being drilled in some cases, and not others. At the same time, the NC programs used to cut materials typically define the features to be drilled in terms of workpiece (e.g. airplane) coordinates. This makes it difficult to quickly visualize the drilling process. What is needed is a process that permits quick visualization of any drilling process on any airplane in the facility. However, such NC programs are typically not maintained in the automated drillers, but in a server maintained by a team of NC programmers, and downloaded to the automated drillers when needed.

Fourth, if action is to be taken on a cutter or automated drilling machine, such action often requires human intervention. At the same time, the automated drilling machines operate on rails and their location is not always know. Hence, maintenance or identification of failures and failure modes is delayed and greater expense is incurred. For example, maintenance personnel may need to find the location of a machine that has presented an operational issue. Research personnel may need to locate a cutter that has been flagged as defective. The defective cutter is normally associated to an automated driller in which the cutter was being used.

Also, since different computer programs may be used in the automated drillers, depending on the automated driller involved in the process. This can result in different software versions, files, and timestamps of each automated driller. While it is possible to implement a network solution that involves adding new software to each machine, it is desirable to instead allow such software to be used within the network solution. What is needed is a way to implement a network solution that uses existing software solutions installed on the automated drillers and elsewhere.

Fifth, for purposes of interchangeability with any production line and uniformity of machine setup, the automated drillers communicate using an internet protocol (IP) address. That IP address may potentially be used to identify machine locations. However, the IP address for each automated driller is not unique, and hence, the IP address cannot be used to track or manage each automated driller independently from the other drillers. Further, many automated drilling machines include related system elements that would require reconfiguration and communication. Changing the IP address of each of the automated drilling machines is possible, but this would require re-configuration the communication between such systems. For example, such systems may include a human interface (HMI) computer, camera, and associated controller. Cameras allow for positioning of the machine to index features to be cut. Since such cameras are typically communicatively coupled to other elements of the network via Ethernet, they use an IP address to communicate with the controller. Use of a new IP address would require a re-configuration of this communication interface and long term maintainability issues.

It is desirable to have the capability to quickly and economically modify the parameters of the controllers of the automated drilling machines. For example, in a drilling application, such parameters may include drill spindle speed, feed rate, whether cooling or pecking are needed.

Finally, it is also desirable to audit the software used in the automated drilling machines. Some such machine controllers include nearly 4000 parameters that need to be tracked, and in a large manufacturing machine (which may have nearly 100 automated drilling machines each of which may have been reconfigured since the last audit), it is very difficult to know if all of them are running with the correct parameters or software versions. Accordingly, an apparatus and method to monitor and modify the parameters (e.g. by writing data and/or commands to the controller) remotely would be beneficial. This apparatus and method may to keep track of which entity is making the changes to machine configuration parameters and software, and keep track of revisions to the process control documents (PCDs) that describe such revisions.

A system and method addressing the foregoing needs is described in the specification below.

SUMMARY

To address the requirements described above, this document discloses a system and method for cutting at least one of a plurality of features in a workpiece with at least one of a plurality of cutting tools controlled by at least one of a plurality of cutting tool machines. In one embodiment, the method comprises receiving process information describing cutting parameters for the at least one feature from the at least one of the cutting tool machines, retrieving predicted cutting tool wear information relating a predicted cutting tool wear value for the one of the plurality of cutting tools to the cutting parameters, retrieving cutting tool information comprising measured cutting tool wear information for the one of the plurality of cutting tools, the measured cutting tool wear information describing a temporally previous measured cutting tool wear value for the cutting tool, computing a predicted cutting tool wear value for the one of the plurality of cutting tools from the measured cutting tool wear information, the predicted cutting tool wear information and the cutting parameters, and cutting the at least one feature according to the computed predicted cutter wear value. Other embodiments are evidenced by means for performing the foregoing operations including a processor communicatively coupled to a memory storing instructions for performing the foregoing operations.

BRIEF DESCRIPTION OF THE DRAWINGS

Referring now to the drawings in which like reference numbers represent corresponding parts throughout:

FIG. 6 is a diagram of setup interface for a one or more kits of cutting tools;

FIG. 7 is a diagram illustrating cutting tool parameters for a particular cutting tool;

FIG. 9 is a diagram illustrating a user interface sharing a result of a search for a particular cutting tool;

DESCRIPTION

Figure 1:
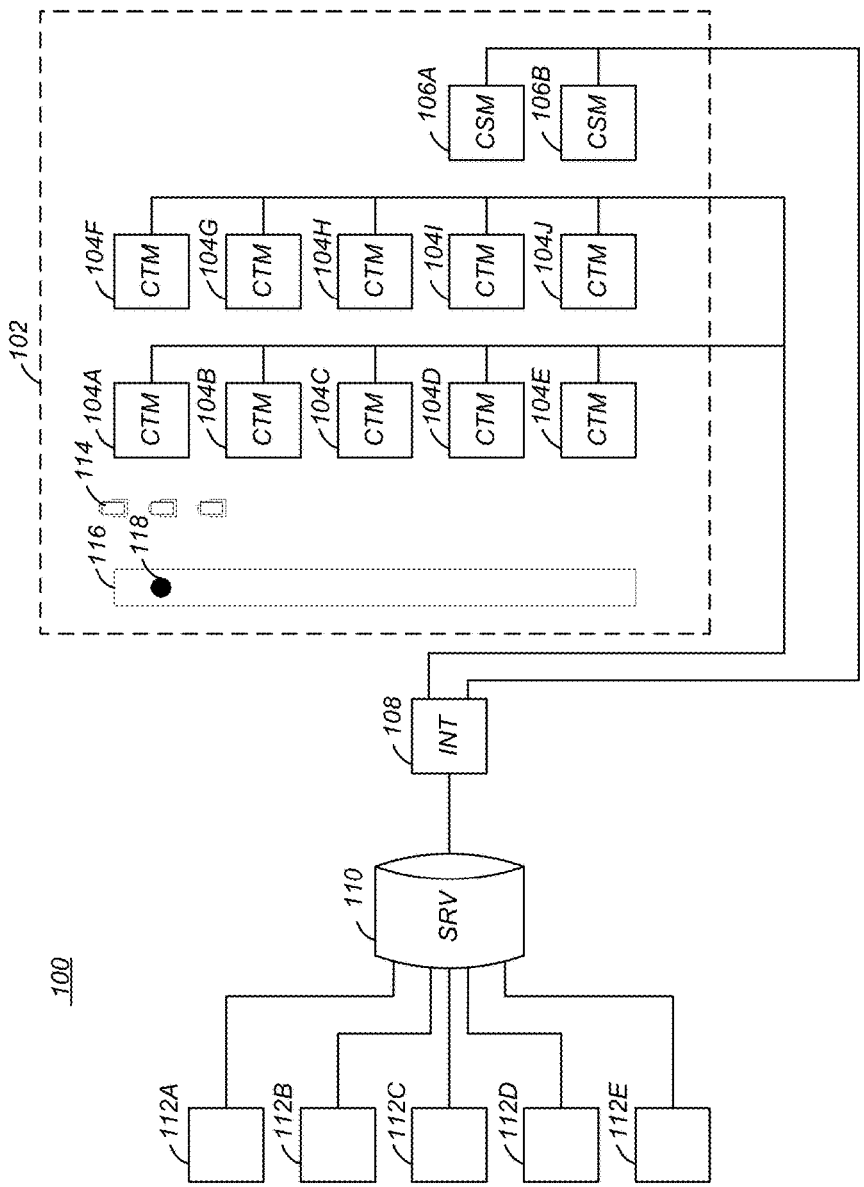
FIG. 1 is a diagram illustrating one embodiment of an automated production system

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and methods described below permit centralized operations for set up and automation (COSA) of automated drilling machines using the existing data collection systems. Use of existing systems permits the system to be more inexpensive and efficient.

The system includes a secure network behind a firewall that allows data transfers from and to specific network devices using defined network ports. A lightweight service collects the data gathered by the existing data collection system and transfer the data where needed in a standard format common to all machines. The service runs from a central location and pulls the information from the automatic drilling machines. This pulling technique reduces cost, as the software resident on the drilling machines does not have to be modified or replaced. Further, since the controllers on each automated drilling machine may use different software, this solution permits easy configuration changes in order to communicate and retrieve data from different controllers.

In one embodiment, data is collected in a normalized format that can be accessed at high speed with minimal errors (advantageous, because the data collected by the machine can amount to millions of records per month). Advantageously, the IP addresses of the machines need not be modified in order for the system to identify the automated driller being audited. Instead, the equipment identification is handled on demand by a combination of file sharing, stream data transfer, file identification, file queueing, and windows remote user access. Lightweight software modules are installed in the automated drilling machines that allow to auditing of the software, files and timestamps of the automated drillers using parameters defined in a central and remote location.

In one embodiment, the system parses the NC programs installed on each automated drilling machine on demand to retrieve cutter wear factors stored in the machine parameters and calculates the estimated usage and predicted life of cutters based on theoretical stack up thicknesses and/or other parameters.

In one embodiment, the system also allows use a new process to translate airplane coordinate into a standard format that can be displayed in a web browser without the usage of any plugin or additional software. The translation of coordinates uses the mathematical technique of coordinate transpose, transformation in conjunction with inches to pixels conversion and div container positioning techniques in HTML and CSS.

The system offers instant and on demand visibility of automated cutter machine locations without the need to define different IP addresses for each machine. The system is also able to identify the locations of machines that use wireless to connect to the network by using the information from the sensors at the base of the machines.

The system can also implement new processes that allow the instant identification of the location of a cutter in the factory at any given moment, offering a full trace of all transactions executed by any given cutter since the time that the cutter was setup. This also permits tracking compliance and allows for the instant identification non-compliant and/ or potential non-conforming drilling operations and the flagging of machine operations that are using parameters that have not been qualified. In one embodiment, the system communicates using a machine transfer data agent (MTDA) that involves communicating through a common language that provides the ability to write to the controllers of the automated drillers on a remote basis.

The foregoing systems and methods have the following advantages over other systems and solutions. In particular, although software can be installed on automated drilling machines to collect and transfer data over a network, such as those complying with MTCONNECT, such systems cause interference with subsystems such as those that control cameras, and also disrupt communications between the automated drilling machine controllers and the human machine interface computers from time to time. Further, such interfaces provide limited data collection and wrap collected data in an XML format, which is not well suited to the large amounts of data needed to manage and monitor a large network of automated drilling machines. Such systems also use telnet to transfer data which is not an ideal protocol for this application. Such systems also require that each element of the network (including each automated drilling machine) be associated with an IP address, so that each such device in the network can be identified. This would require that each IP address of each machine in the network would need to be reconfigured.

With respect to the visualization of the drilling processes planned, in process or completed, plugins are available to visualize engineering drawings. However, such plugins (including 3DVIA and CATIA COMPOSER) require drawing to be stored in the CNC equipment, while the information in current systems is resident in the NC programs implemented by the automated drilling machines, and such data is in airplane coordinates, which are visually unhelpful.

Finally, existing software auditing programs such as ASPERA is not capable of auditing files in different formats, driver versions, and time stamps in addition to installable software packages. The machines are used in the production of airplanes and adding heavy software packages may impact the operation of the machines unexpectedly, and the risks (e.g. interruption of production) of adding large software packages with many features and networking capabilities is unacceptably high.

Automated Production System

FIG. 1 is a diagram illustrating one embodiment of an automated production system 100. The system comprises a network 102 of devices that include cutting tool machines automated drilling machines 104A-104J (hereinafter alternatively referred to as cutting tool machines (CTMs) 104), and cutter set up machines 106A-106B (hereinafter CSMs 106). Each CTM 104 is associated with one or more cutting tools 114, which are used to cut one or more features 118 in one or more workpieces 116. The CTMs 104 and cutter set up machines 106 are communicatively coupled to a server 110 via a communications interface 108. The server 110 may comprise a SQL server, for example. The server 110 is communicatively coupled to one or more processing devices 112A-112E (alternatively referred to hereinafter as processing devices 112) that provide commands and receive data from the server 110. Such processing devices 112 may include computers having direct read only connections to the database 10 using SQL tools such as SQL MANAGEMENT STUDIO, dedicated servers hosting applications to interface with the server 110 or tier three applications, or applications on cloud servers.

Figure 2:
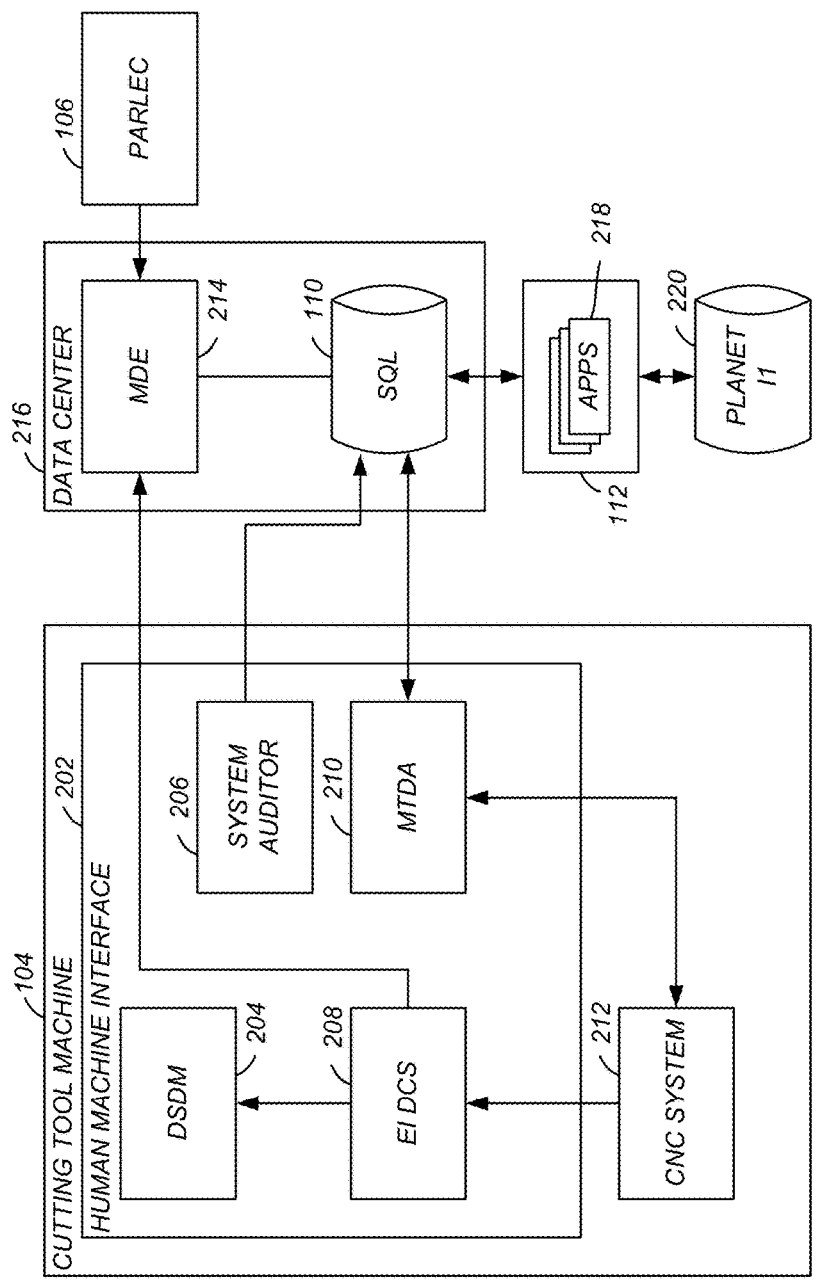
FIG. 2 is a diagram providing additional details of the cutter tool machines and other network elements.

FIG. 2 is a diagram providing additional details of the CTMs 104 and other network 100 elements. Each CTM 104 comprises a computer numerical control (CNC) system 212 that responds to programmed commands stored in a storage medium (a computer command module, located in the ADS 104) to cut features in the workpiece, and a human machine interface (HMI) 202 used to manage the CNC system 212. The HMI 202 may comprise, for example a computer running an operating system such as WINDOWS or IOS.

The CNC system 212 provides cutting tool machine 104 activity information to an electro impact (EI) data collection system (DCS) 212 of the HMI 202. The cutting tool activity information includes, for example, what operations the CTM 104 has performed or will perform (according to the NC program implemented on the CTM 104) with which cutting tools 114 and at which time. For example, in one embodiment, the activity information collected by the DCS 212 includes an identifier of each hole drilled, along with associated information such as the coordinates of the hole, drill speed, a feed rate, drill duration used to drill the hole. The activity information may also include whether coolant was used to drill the hole, which drill bit was used (which may include an identifier of the drill bit itself) to drill it, and when such drilling began and was completed. The activity information may also include information collected after drilling, for example, whether the drilled hole was probed for measurements, and if so, the measured dimensions and coordinates of the drilled hole.

The CNC system 212 also provides machine status information to a machine tool data agent (MTDA) of the HMI 202. Machine status information is used to determine overall equipment effectiveness (OEE), and includes, for example, on/off status, recording of machine events such as pause, freehold, jogging, drilling, error status, stop, and emergency step. Such events can be used to analyze the efficiency and downtime of the cutting tool machine 104. The machine status information comprises, for example, measured cutting tool 114 wear. This cutting tool machine status information is provided to the database 216 for storage.

The HMI 202 also comprises a system auditor 206, which checks the software installed on the CTM 102 and records any discrepancies in a database 216. The database 216 is managed via applications 218 executed by the processing device 112. Such applications can retrieve and process data stored in database 110 or remote database 220 to maintain version control of the NC programs by providing a secure repository, and store the result in databases 110, 220. Such applications 218 include applications for generating quality reports and or a specific COSA application for implementing the operations discussed further below.

As described further below, a data center 216 module comprising a machine data extraction (MDE) module 214 pulls machine activity information from the EI/DCS 208. This can be accomplished, for example, via a operating system service that fetches data from EI/DCS 208 files. The pulling of cutting tool machine activity information implemented by the MDE module 214 permits the network 100 to retrieve information from a wide variety of NC applications and types implemented on the CTMs 102.

Figure 3:
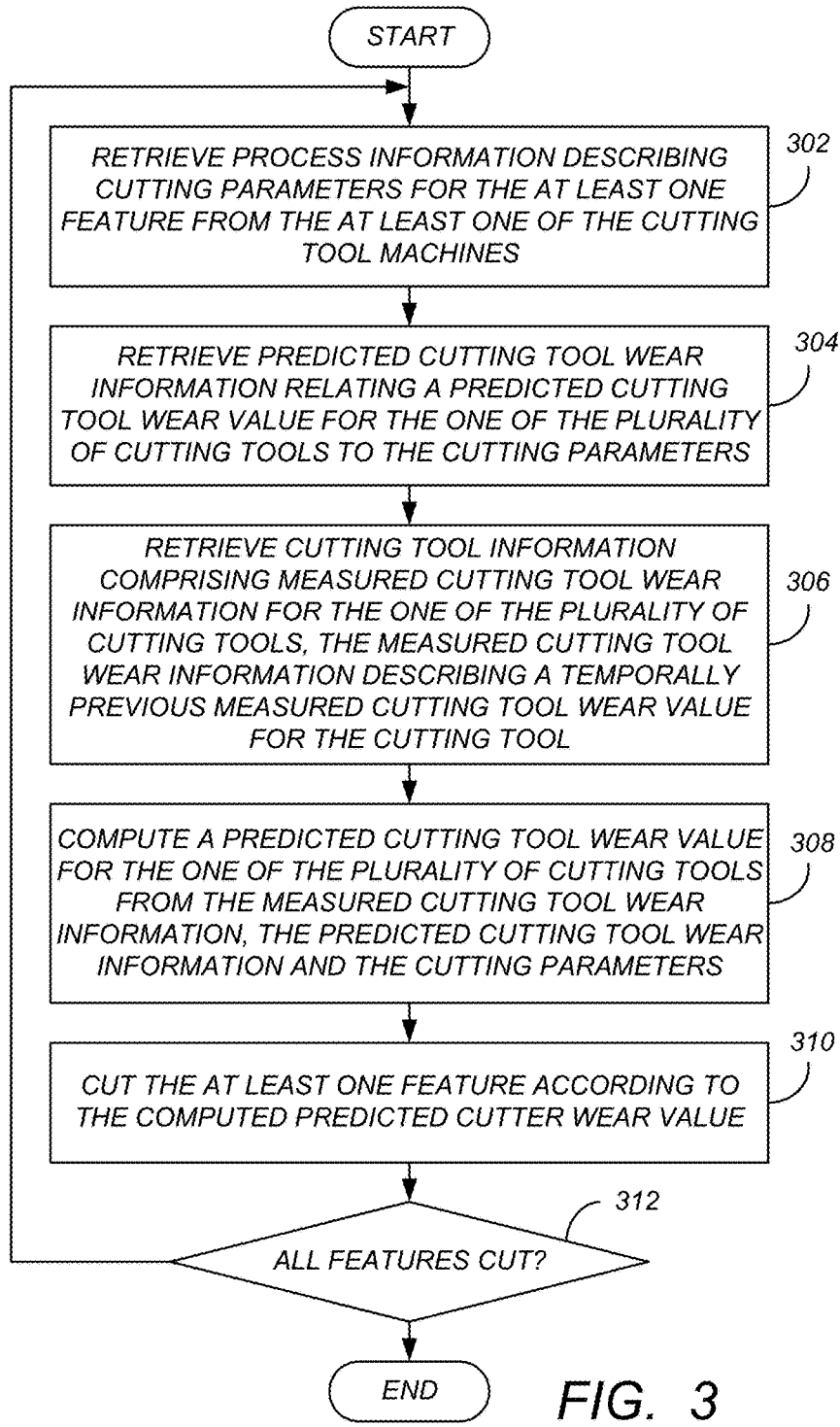
FIG. 3 is a diagram presenting illustrative operations that can be used to cut one or more features in a workpiece such as an aircraft.

FIG. 3 is a diagram presenting illustrative operations that can be used to cut one or more features in a workpiece 116. In block 302, process information describing cutting parameters for cutting the one or more features 118 in the workpiece 116 is retrieved from the CTM 102 that is cutting the workpiece 116. In one embodiment, this is accomplished by the MDE module 214 pulling NC program that describes the cutting parameters from the CNC system 212. The NC program is thereafter parsed to extract the cutting parameters for the feature 118 to be cut in the workpiece 116.

The cutting parameters describe the feature 118 to be cut and the cutting tool 114 operations required to cut the feature 118. For example, in one embodiment, the cutting parameters comprise feature information such as the location of the feature 118 in the workpiece 116, the composition of the workpiece 116 at the location of the feature 118 to be cut, and a dimension of the feature 118 to be cut in the workpiece 116. The cutting tool operation information includes any one or all of the cutting tool 114 dimension(s), cutting tool 114 material composition, cutting tool 114 speed, cutting tool 114 force (to be applied to the workpiece 116 by the cutting tool 114), whether coolant is to be used in the operation of the cutting tool 114, and if so, what coolant.

As further described below, the cutting tool information may also comprise cutting tool tracking information. In one embodiment, the cutting tool tracking information comprises an identifier of the cutting tool (which may be used as a surrogate for the cutting tool dimensions and material composition), the physical location of the cutting tool 114, an identifier of each feature cut by the cutting tool up to the current time, and an identifier of the process information (e.g. NC program) used to cut each of the features that were cut by the cutting tool 114.

In block 304, predicted cutting tool wear information is retrieved. The predicted cutting tool wear information relates the cutting parameters to predicted cutting tool wear values. The predicted cutting tool information is used to predict the cutting tool 114 wear and is discussed further below.

In block 306, cutting tool information is retrieved. The cutting tool information comprises measured cutting tool wear information for the cutting tool 114 to be used to cut the feature 118 in the workpiece 116, and includes cutting tool wear information describing temporally previous cutting tool wear value for the cutting tool 114. For example, in one embodiment, the cutting tool information comprises the most recently wear of the cutting tool 114 that will be used to cut the feature. In one embodiment, the cutting tool wear information is obtained from database 110, which received the information from the MTDA 210.

In block 308, a predicted cutting tool wear value for the cutting tool is computed from the measured cutting tool wear information, the predicted cutting tool wear information, and the cutting parameters. The predicted cutting tool wear value is a prediction of the cutting tool wear that will result after the cutting tool 114 cuts the feature 118 described in the cutting parameters. In block 310, the feature 118 is cut according to the computed predicted cutter wear value.

Figure 4:
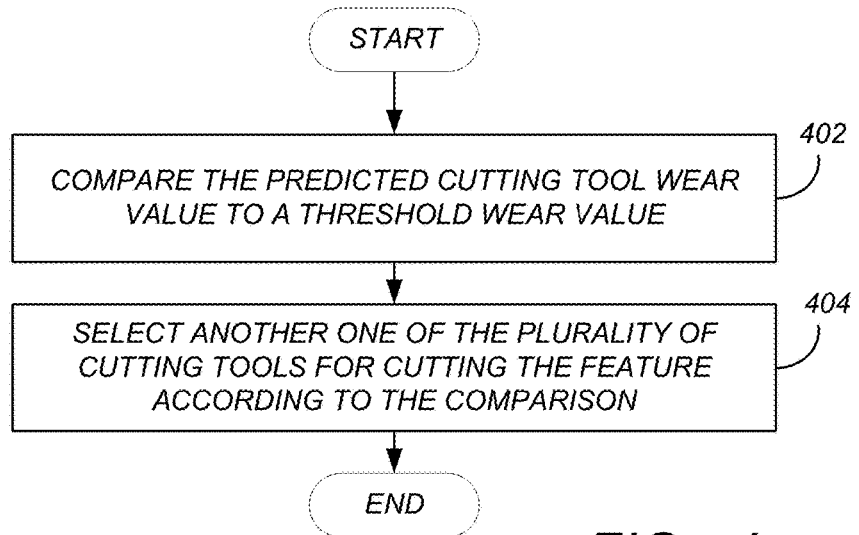
FIG. 4 is a diagram illustrating operations exemplifying the cutting of the feature according to the computed predicted cutter wear value.

FIG. 4 is a diagram illustrating operations exemplifying the cutting of the feature 118 according to the computed predicted cutter wear value. Block 402 compares the predicted cutter wear value to a threshold wear value. Block 404 selects another one of the plurality of cutting tools 114 for cutting the feature 118 according to the comparison. For example, in one embodiment, if the predicted cutter wear value indicates that the cutting tool 114 wear will be greater than the threshold permitted wear upon completion of the cutting of the feature 118 using the current cutting tool 114, the CTM 104A will select another one of the cutting tools 114. However, if the predicted cutter wear value is such that the cutting tool 114 wear is less than the threshold maximum permitted wear, the same cutting tool 114 will be used to cut the feature. Other actions are possible, for example, in response to increased wear of the cutting tool, the cutting tool may be used to cut different features in the workpiece, or a different NC program that accounts for the increased wear may be used to cut the feature.

Figure 5A:
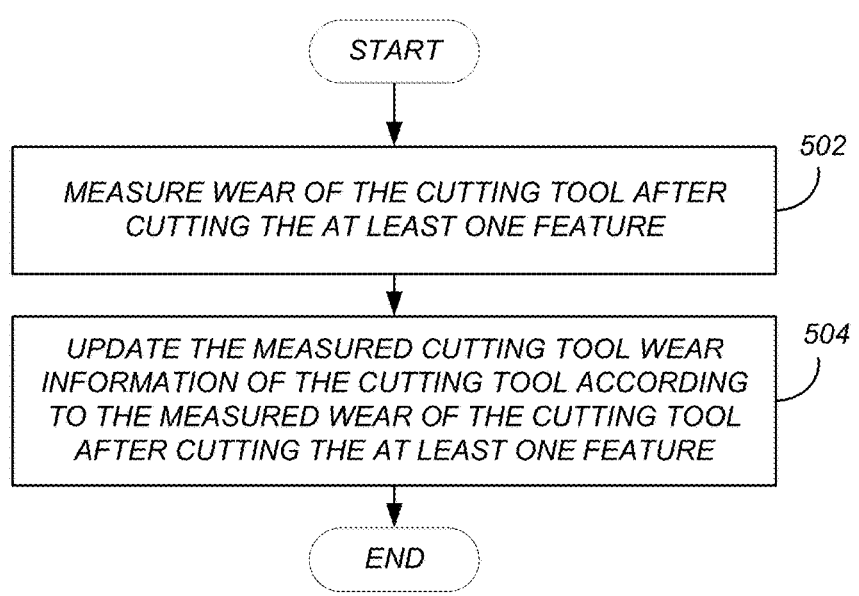
FIGS. 5A-5C are diagrams illustrating operations that can be performed after cutting the feature.
Figure 5B:
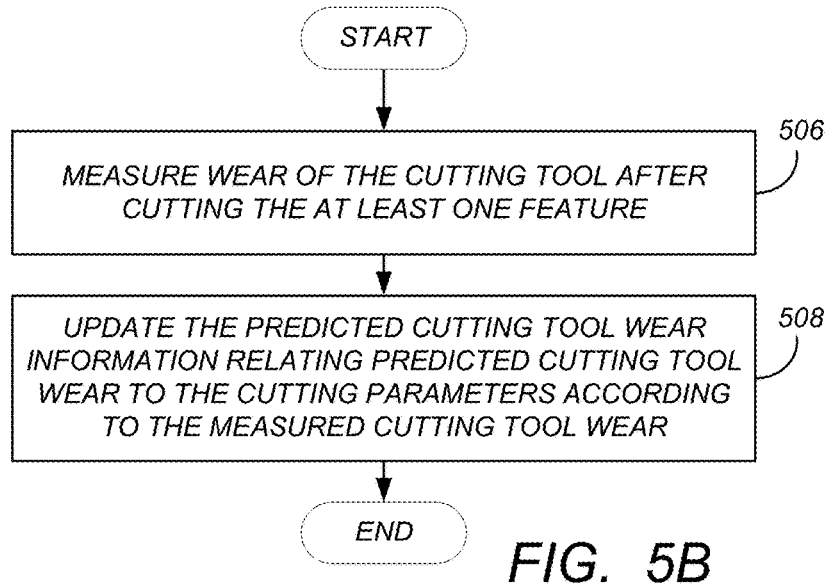
Figure 5C:
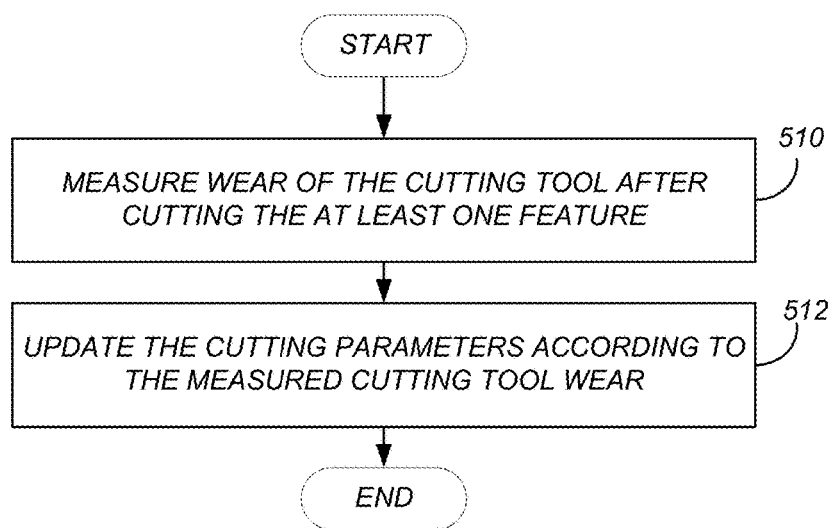

FIGS. 5A-5C are diagrams illustrating operations that can be performed after cutting the feature. Turning first to FIG. 5A, block 502 measures the wear of the cutting tool 114 after cutting the feature 118. This can be accomplished, for example, the CNC system 212, and the resulting data provided to the database 110 via the MTDA 210. In block 504, the measured wear of the cutting tool 114 after cutting the feature 118 is used to update the measured cutting tool wear information of the cutting tool 114. For example, the measured cutting tool wear information is updated to reflect that the cutting tool has worn an additional amount because of the cutting operation just completed. This information is stored in database 216 for later use when another feature 118 is to be cut with the same cutting tool 114.

In FIG. 5B, block 506 measures the wear of the cutting tool 114 after cutting the feature 118. Block 508 updates the predicted cutting tool wear information that relates the predicted cutting tool wear to the cutting parameters according to the measured cutting tool 114 wear. For example, in one embodiment, the predicted cutting tool wear can be compared to the measured cutting tool wear information, and used to determine whether updates to the predicted cutting tool wear information need be made for greater accuracy. Parametric models can be used to use the measured cutting tool wear information to improve the predicted cutting tool wear information on a continuing basis. Further, if the measured cutting tool wear deviates substantially from the predicted cutting tool wear, the system may flag the user to investigate the cause.

Turning next to FIG. 5C, block 510 measures the wear of the cutting tool 114. Block 512 updates the cutting parameters according to the measured cutting tool 114 wear. In one example, changes may be made in the speed of the cutting tool, whether coolant is used with the cutting tool when in use, or the cutting tool 114 may be reassigned to cut different features 118 in the workpiece 116. For example, if cutting one feature 118 is predicted to consume 20% of the remaining life of the cutting tool 114, and the cutting tool wear is 85% of maximum life, the cutting tool 114 may be reassigned to cut a different feature that is predicted to consume only 15% of the remaining life of the cutting tool 114. This allows the cutting tools 114 to be used closer to their maximum life, thus reducing waste.

Cutting Tool Tracking

One of the key advantages of the automated production system 100 is that it permits detailed tracking of the cutting of the features 118 and the cutting tools 114, CTMs 104 and the CSMs 106 used to cut the features 118. The CSMs 106 are used to set up the cutting tools 114 and CTMs 104. In the past, set up was a paper process, and the progress of set up operations was tracked using individuals entering information on spread sheets. In using the automated production system 100, cutting tool set up parameters are entered directly into the HIM 202 associated with the CTMs 104 and CSMs 106.

FIG. 6 is a diagram of setup interface 600 for a one or more kits of cutting tools 114 (e.g. tool kits) for operations to be performed on a workpiece 116 comprising an forward section of an aircraft. This setup interface 600 may be presented, for example, on an HRM 202 associated with the CTM 104 of the CSM 106. Column 602 lists an identifying number for each kit. Column 604 lists the cutting tool type, while column 606 presents the cutting dimension (e.g. diameter) of the cutting tool 114. Column 608 lists the serial number associated with the cutting tool 114, and column 610 indicates the date that the cutting tool 114 was set up. Column 612 indicates the initial tool life (e.g. how much the tool was worn) when the set up was performed, and column 614 indicates the current tool life. Column 616 indicates an identifier of the individual that added set up the cutting tool 114 and entered the information into the interface 600 for storage in the database 110. Column 618 indicates the serial number of the paper tag attached to the tool for easy visual identification.

FIG. 7 is a diagram illustrating cutting tool parameters 706 for a particular cutting tool 114. The parameters include, for example, a serial number 706 of the cutting tool 114, an identifier 706B of the CSM 106 used to set up the cutting tool 114, the cutting tool type 706C, date 706D that the cutting tool 114 was set up, the holder 706E used to secure the cutting tool 114 into the CTM 104, the tool ID 706F, dimensions of the cutting tool 706G-706P, cutting tool life remaining 706Q and the type 706 of CSM 106 used to set up the cutting tool 114. Items 708-712 illustrate setup carts and Parlec IDs, including those associated with a setup not yet used.

Figure 8:
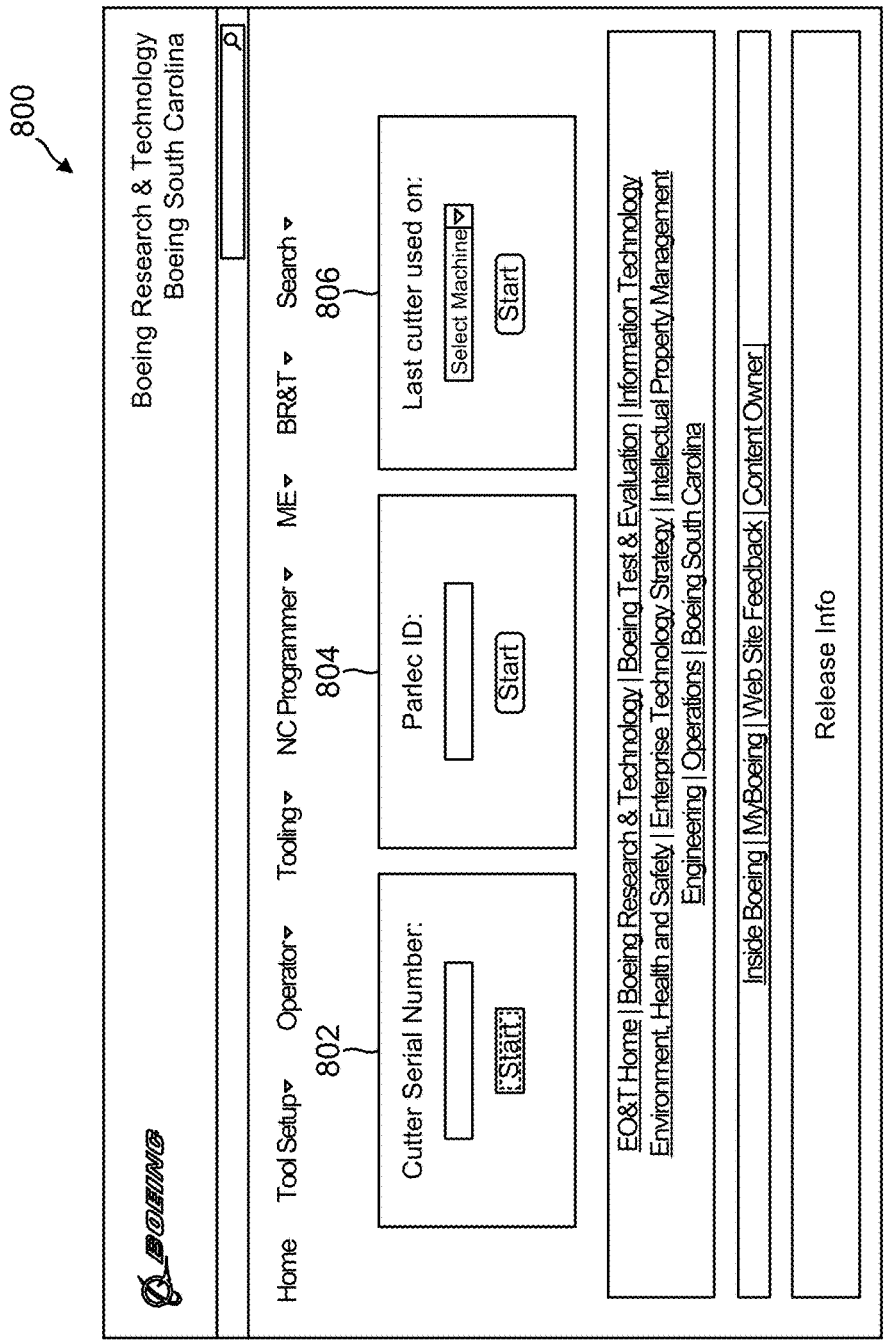
FIG. 8 is a diagram illustrating a user interface that can be used to retrieve information regarding any particular cutting tool.

FIG. 8 is a diagram illustrating a user interface 800 that can be used to retrieve information regarding any particular cutting tool 114. Portion 802 can be used to search for a cutting tool 114 by cutting tool serial number. Portion 804 can be used to search for a cutting tool by an identifier of the CSM 106 used to set up the cutting tool 114. Portion 806 can be used to identify the last cutter used on any particular one of the CTMs 104.

FIG. 9 is a diagram illustrating a user interface 900 sharing a result of a search for a particular cutting tool 114. In this instance, a search was performed using user interface 800 for information regarding cutting tool serial number 285. The information provided includes (reading from left right), the date that the cutting tool 114 was used to cut the particular feature 118, the workpiece (airplane or ship) in which the feature 118 was cut by the cutting tool 114, an identifier of the feature (or hole) the cutting tool was used to cut in the airplane, the expected or actual stackup (material thickness) of the workpiece 116 in the location of the feature 118, the cutting tool life, the maximum thrust that was used to direct the cutting tool into the airplane surface, an identifier of the process that was performed by the cutting tool 114, the current measured diameter of the cutting tool, the NC program used to cut the feature using the cutting tool, and the CTM 104 used to cut the feature.

Figure 10A:
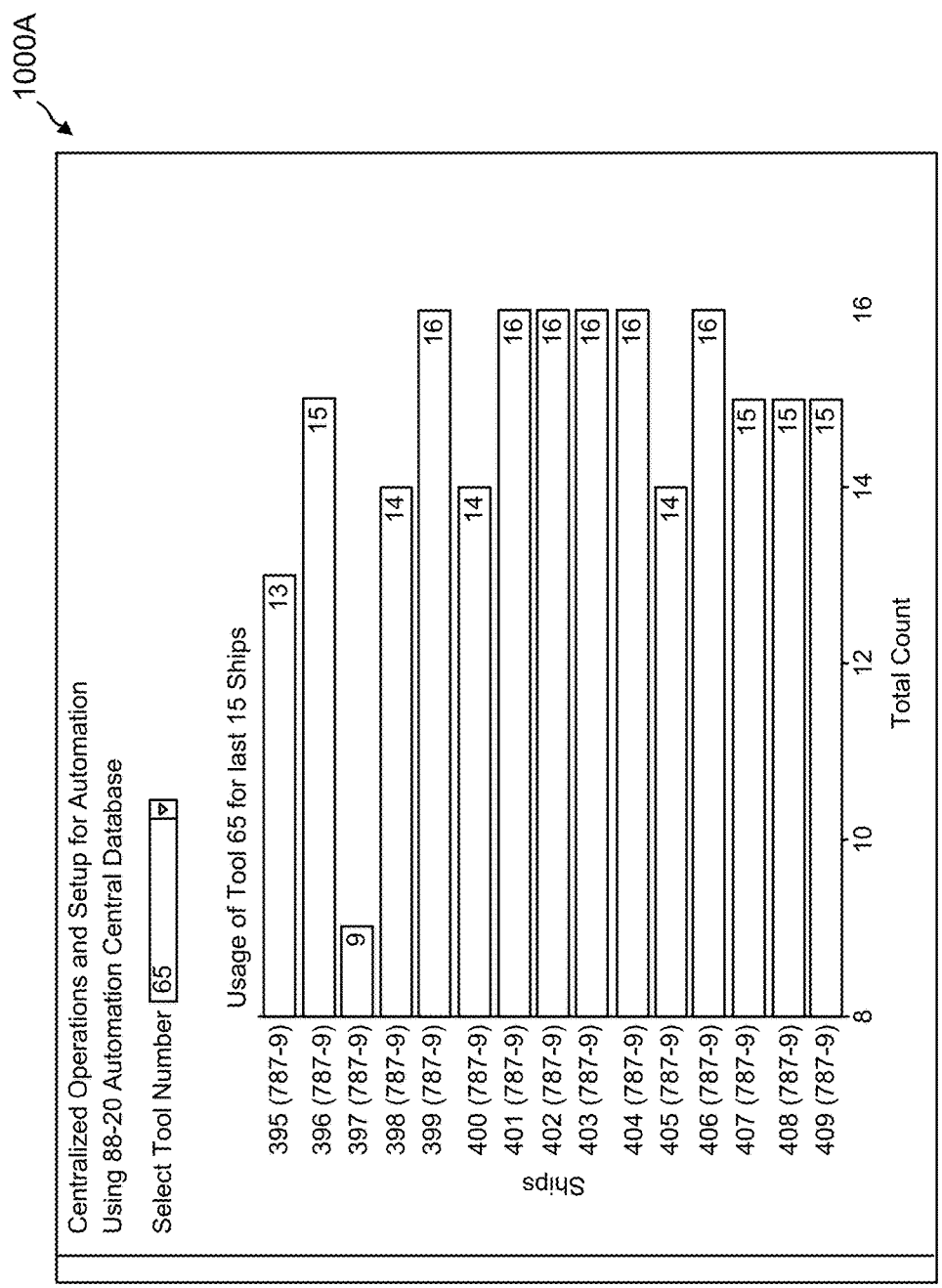
FIGS. 10A and 10B are diagrams further user interfaces for presenting cutting tool tracking information.
Figure 10B:
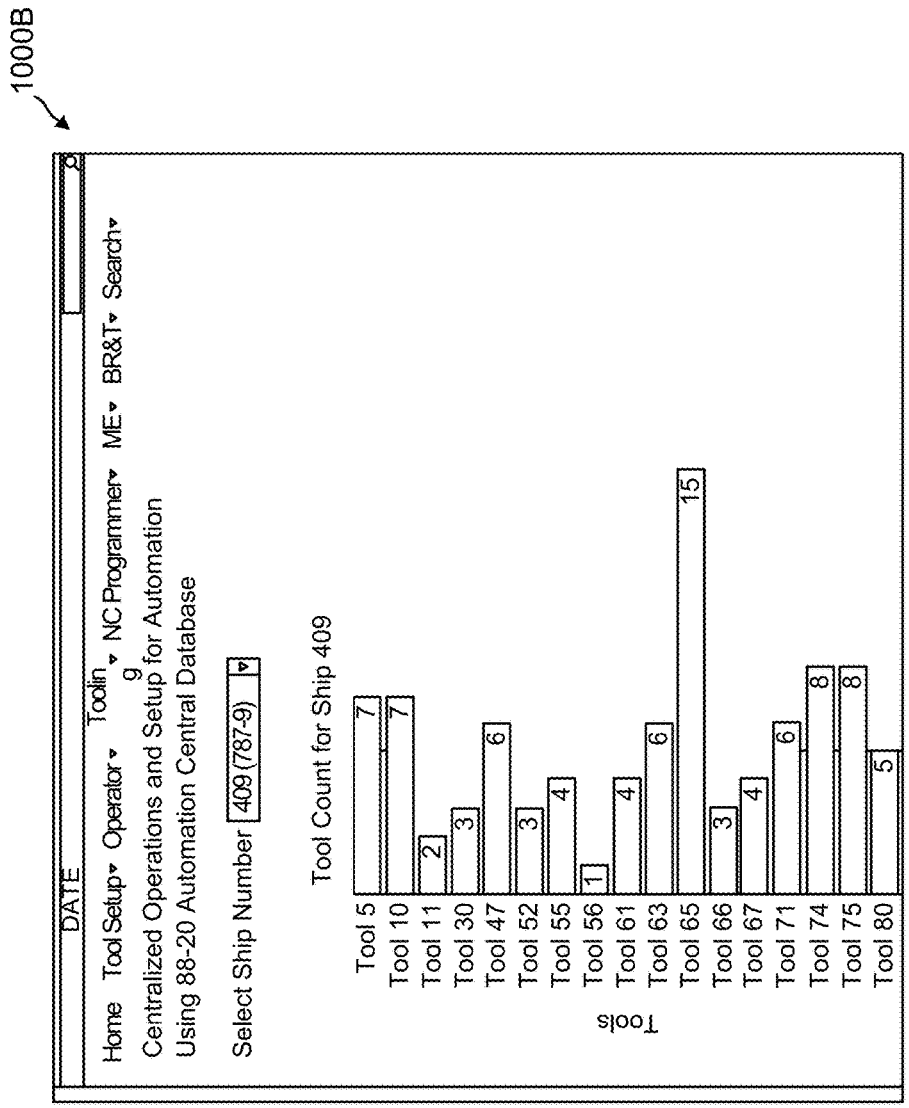

FIGS. 10A and 10B are diagrams further user interfaces 1000A and 1000B for presenting cutting tool tracking information. In FIG. 10A, the user has entered a cutting tool number into user interface 1000A and is presented with the total number of uses of the cutting tool (or cutting tool type) on a plurality of airplanes. Each of the horizontal bars represents a different airplane, and the length of the bar represents to total number of times the cutting tool 114 was used on each respective airplane. This data permits the user to note situations where a particular cutting tool 114 or cutting tool type was used fewer times on a particular airplane than other airplanes, thus allowing the user to detect anomalous behavior. FIG. 10B is a diagram of a user interface 1000B showing analogous results. This result indicates which type of cutting tools 114 were used on a particular aircraft, and how many of such cutting tools 114 were used.

Drill Mapping

Figure 11:
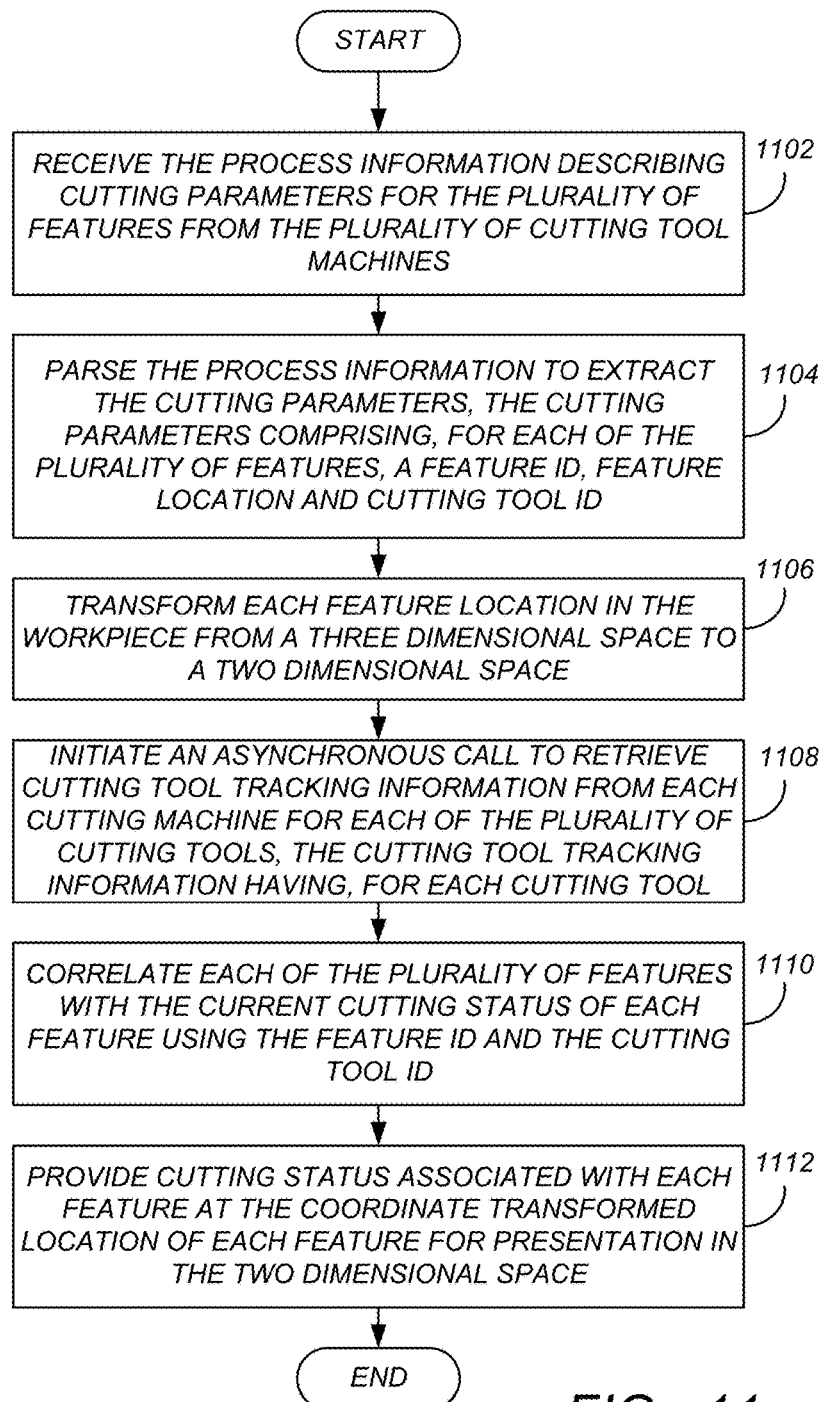
FIG. 11 is a diagram illustrating illustrative operations that can be used to visualize the progress of the cutting of features.

FIG. 11 is a diagram illustrating illustrative operations that can be used to visualize the progress of the cutting of features 118. Block 1102 receives process information describing the cutting parameters for the plurality of features from the plurality of cutting machines. In one embodiment, this is accomplished by the data pull module 214 pulling the NC program from the CNC system 212 via the EI/DCS 208.

Figure 12:
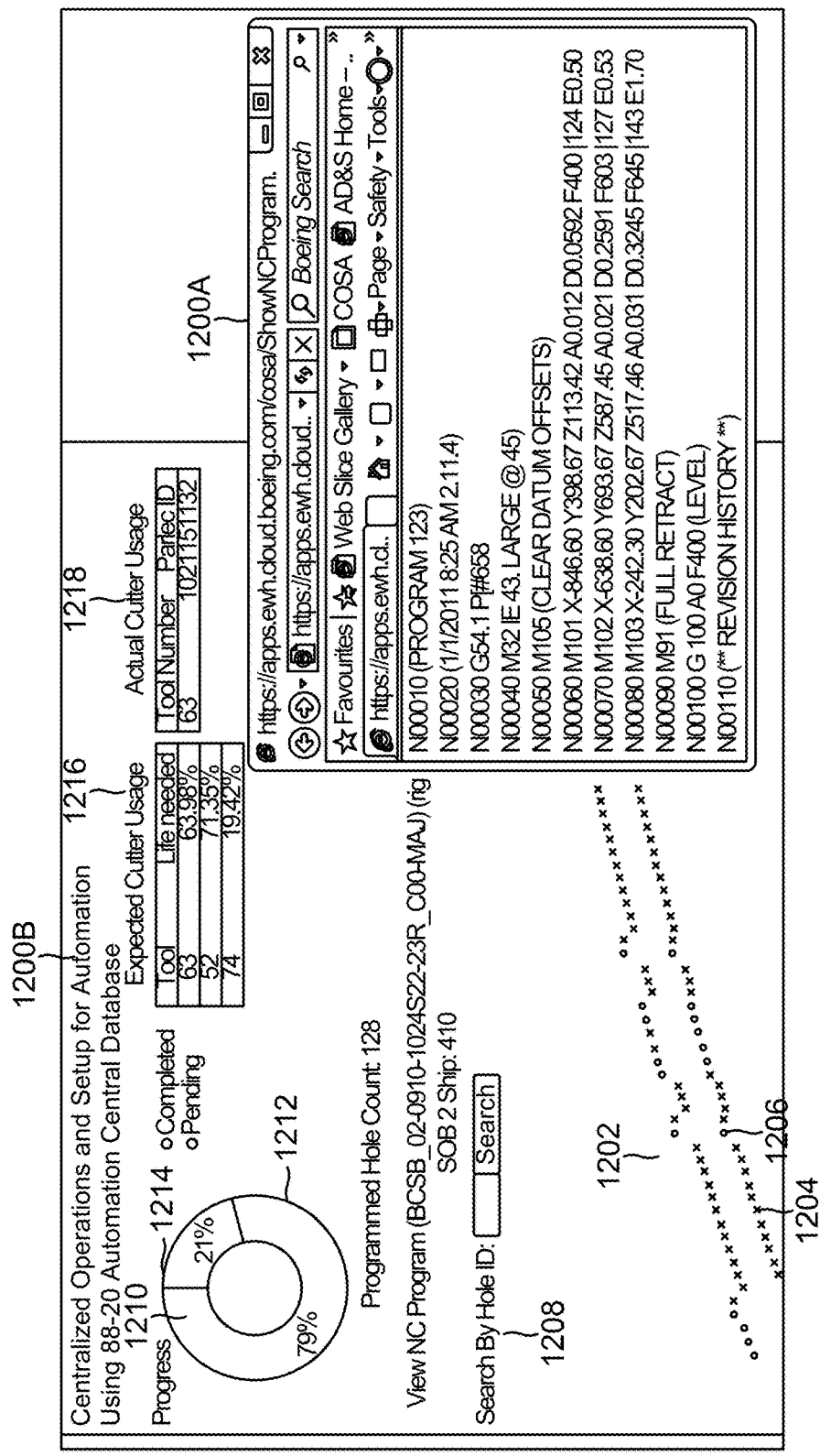
FIG. 12 is a diagram illustrating a user interface presentation of a typical NC program, and a user interface presentation of drill mapping

FIG. 12 is a diagram illustrating a user interface 1200A presentation of a typical NC program, and a user interface 1200B presentation of drill mapping. As shown in user interface 1200A, the NC program comprises a plurality of instructions which define which features 118 are to be cut by which cutting tools 114 and how such cutting is to be accomplished. The data pull module 214 pulls these instructions from the CNC system 212 via the EI/DCS 208.

In block 1104, the process information is parsed to extract the cutting parameters. The cutting parameters may include, for each of the plurality of features to be cut, a feature ID, the feature location, and a cutting tool ID associated with the cutting tool 114 that the NC program has scheduled to cut the feature 118. In block 1106, each the location of each feature 118 (obtained from the parsing operation of block 1104) is transformed from a three dimensional space to a two dimensional space.

Next, in block 1108, while the plurality of features is being cut in the workpiece 116, a call is initiated to retrieve cutting tool 114 tracking information from each CTM 104 for each cutting tool 114 that the NC program(s) retrieved in block 1102 have scheduled to cut features 118 in the aircraft. This call may be initiated after each feature 108 is scheduled to be cut, can be periodically scheduled, or can be aperiodically and asynchronously scheduled. The cutting tool tracking information comprises, for example, a cutting tool ID, and the feature ID for each feature cut by the cutting tool 114.

In block 1110, each of the plurality of features is correlated with the current cutting status of each feature using the feature ID and the cutting tool ID. Hence, if the NC program is parsed and it identifies that feature A is to be cut with cutting tool X, feature A is correlated with cutting tool X and the current cutting status of cutting tool X is examined to determine whether the cutting tool is schedule to cut the feature, is in the process of cutting the feature, or has already cut the feature. In block 1112, the cutting status associated with each feature 118 is provided at the coordinate transformed location of each feature 118 for presentation in the two dimensional space. Cutting status may include, for example, whether the feature is currently being cut, whether the feature has been previously cut, and whether the feature is uncut. The cutting status may also include whether the cutting of the feature incurred an error, and whether the cut was completed or not despite the error.

The cutting status in a two dimensional space can be presented in a two dimensional space using hypertext markup language (HTML) techniques. This can be accomplished by extracting each of the feature 118 locations in three dimensional (x, y, z) coordinate, and coordinate transforming each of the three dimensional feature locations into the two dimensional space having an x (horizontal) and y (vertical) direction. Then, the cutting status is provided for display by determining a minimum value of the x direction of the two dimensional space and a y direction of the two dimensional space. This can be determined, for example, by the minimum value of the feature locations in the two dimensional space. Similarly, a maximum value of the x direction of the two dimensional space and a maximum value of the y direction of the two dimensional space may be determined from the maximum value of the feature location in two dimensional space. A scale factor is then computed. The scale factor is based on the dimensions (in the horizontal and vertical direction) of the window in which the drill map 1202 is to be presented and the minimum and maximum values of the x and y directions computed above. Then, the feature location (in 2D coordinates is scaled according to the scale factor. The resulting data is provided for display.

FIG. 12 also illustrates user interface 1200B. The user interface 1200B includes a drill map 1202 in a two dimensional space in which the feature 118 locations have been mapped in x and y coordinates. Features which have yet to be cut are indicated by an "x," 1204 while features which have been cut are indicated by a "o" 1206 Those features which have been cut may be further delimited according to whether the feature 118 was properly cut. For example, if the feature 118 was cut without errors (and/or measured to be the proper dimension), the "o" 1206 associated with the feature may be colored green, but if the feature 118 was cut with errors (or does not measure to specification), the "o" 1206 presented in the two dimensional drill map 1202 may be colored red.

Figure 13:
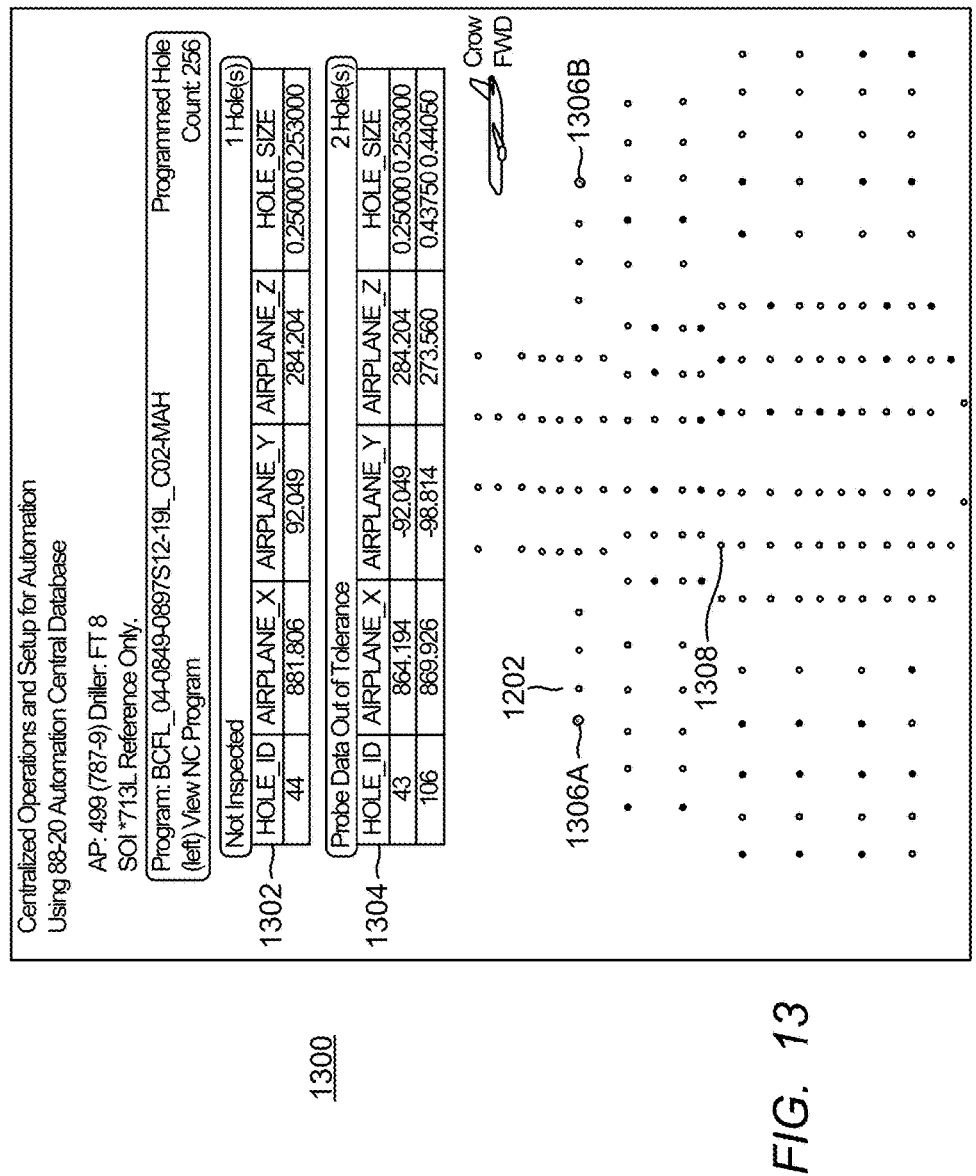
FIG. 13 is a diagram illustrating another embodiment of a user interface presenting the drill map.

FIG. 13 is a diagram illustrating another embodiment of a user interface 1300 presenting the drill map 1202. In this embodiment, a drill map 1202 is presented for 256 holes to be drilled by a particular NC program. A subset of the features 118 that were cut have been probed to determine if the resulting feature 118 is within tolerances. In this embodiment, each depiction on the drill map 1202 that represents includes the feature ID. Features that were not probed to determine their dimension are indicated in table 1302 and illustrated by delimiter 1308, and features that were probed and were out of tolerance are listed in table 1304 and illustrated by delimiters 1306A and 1306B.

Control 1208 may be used to search for the progress of any particular feature 118, by feature ID. Upon selection, that feature 118 may be highlighted on the drill map 1202. The drill map 1202 in FIG. 12 may depict the progress of the cutting of features 118 by a single CTM 104, all CTMs 104, or any subset thereof. Further, the cutting of the all of the features 118 scheduled to be cut by the CTM 104 (or CTM 104 group) may be illustrated by progress indicator 1210, which indicates what fraction or percentage of the features 118 scheduled by the NC program(s) to be cut have been completed (by region 1212) and what percentage of features 118 remain uncut (by region 1214).

Further, portion 1216 presents a list of cutting tool 114 types and how much of those cutting tools are expected to be used in the cutting of the features 114 depicted in the drill map 1202. Predicted cutting tool usage can be determined by retrieving the predicted cutting tool wear information that relates the predicted cutting tool wear value for the cutting tools to the cutting parameters. Further, cutting tool information is retrieved. The cutting tool information comprises cutting tool wear information for each of the cutting tools 114 being used to cut the features 118 depicted in the drill map 1202. Such cutting tool wear information describes the current wear status of the cutting tool 114, which may be determined as a sum of the wear caused by each cutter tool 114 use. Using the measured cutting tool wear information, the predicted cutter tool wear information, and the cutting parameters for each cutting tool, a predicted cutting tool wear value is computed for each of the cutting tools depicted in the drill map 1202. The predicted cutting tool wear value is then used to compute the predicted cutting tool usage shown in portion 1216.

Portion 1218 indicates the actual wear of cutting tools 114 by cutting tool type. The actual wear is determined by measuring the wear of each of the cutting tools depicted in the drill map 1202 after each such cutting tool 114 has cut a feature 118. This information is used to update the measured cutting tool wear information of each cutting tool (stored in database 110), which is presented in portion 1218.

Cutting Status

Other information can also be retrieved by the data pull module 214 and used to determine the status of the CTM 194 operations. For example, cutting tools 114 break and wear prematurely. If the locations where such breakage or premature wear are easily identified, the problem may be resolved by providing new cutting tools 114 or sharpening used cutting tools 114.

Figure 14:
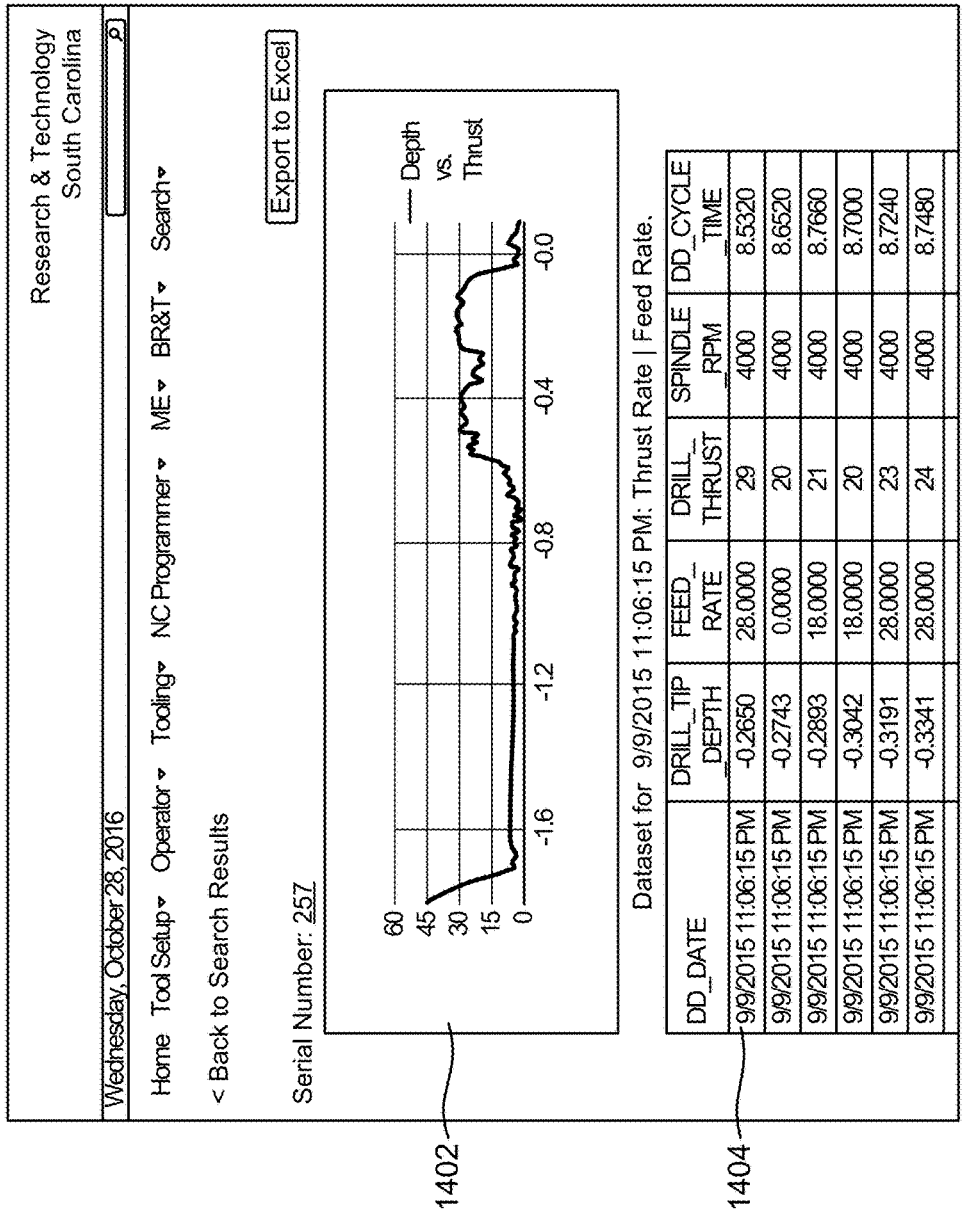
FIG. 14 presents a user interface that can be used to identify broken or prematurely worn cutting tools 114 and to analyze their failure.

FIG. 14 presents a user interface 1400 that can be used to identify broken or prematurely worn cutting tools 114 and to analyze their failure. In the illustrated embodiment, the user interface 1400 includes a plot 1402 depicting the cutting operation (for example thrust rate versus feed rate) and a table describing relevant cutting tool 114 parameters and cutting parameters for a particular cutting tool 114. The automated production system 100 also allows the investigation of errors in the drilling process, and to identify airplanes that may be affected by the errors.

Figure 15:
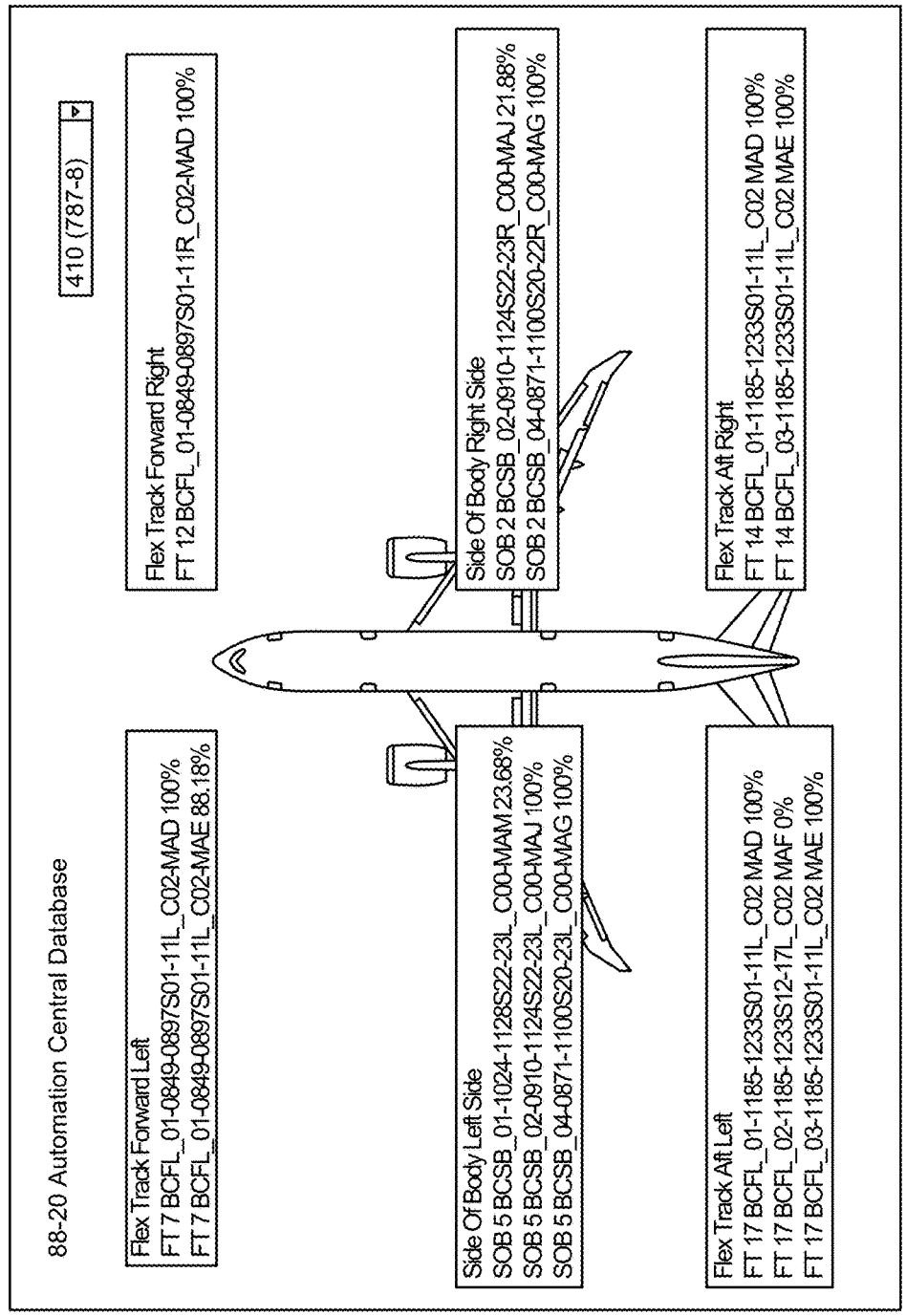
FIG. 15 is a diagram presenting another user interface for viewing cutting status.

FIG. 15 is a diagram presenting another user interface 1500 for viewing cutting status. A representation of the aircraft is presented, and the cutting status for each portion of the aircraft is indicated. In the illustrated example, the aircraft includes a forward left, forward right, side left, side right, aft left and aft right portions. The cutting status for each portion (in terms of percent completion) is indicated, along with an indication of the NC program commanding the cutting process. This data can also be presented in more summary form for more than one aircraft on more than one assembly line.

Version Control

Another advantage of the automated production system is the ability to track a large number of machine parameters and software versions to ensure that all machines are running in synchrony as per process control document (PCD) and version description document (VDD) descriptions. Information can be read from the CTMs 104 and CSMs 106B (e.g. CTM memory values that store the version information of running software and values of machine parameters) into the database 110 and compared to expected values in the latest version of the PCDs and VDDs to perform an audit of the installed software. If any particular CTM 104 of CSM 106 is operating with software that is out of date or unapproved, the audit will generate a message to the user highlighting the inconsistency, the CTM 104 or CSM 106 having the out of date software, and optionally, the location of the CTM 104 or CSM 106. In an optional embodiment, the automated production system 100 may provide the latest software versions to the CTM 104, CSM 106, or other system element and command installation of those updated software versions.

Machine and Cutter Tool Location

As described above, it is advantageous to be able to ascertain the CTMs 104 and cutter tools 114 at any point in time. This is especially important in large factories (typical with aircraft), as the distances between CTMs 104 are often significant, and involve ascending and descending stairs. The automated production system 100 also allows the instant identification of the location of a cutting tool 114 or CTM 104 in the factory at any given moment, offering a full trace of all transactions executed by any given cutting tool since the time that the cutting tool was setup. This also permits tracking compliance and allows for the instant identification non-compliant and/or potential non-conforming drilling operations and the flagging of CTMs 104 that are using parameters that have not been qualified.

Figure 16A:
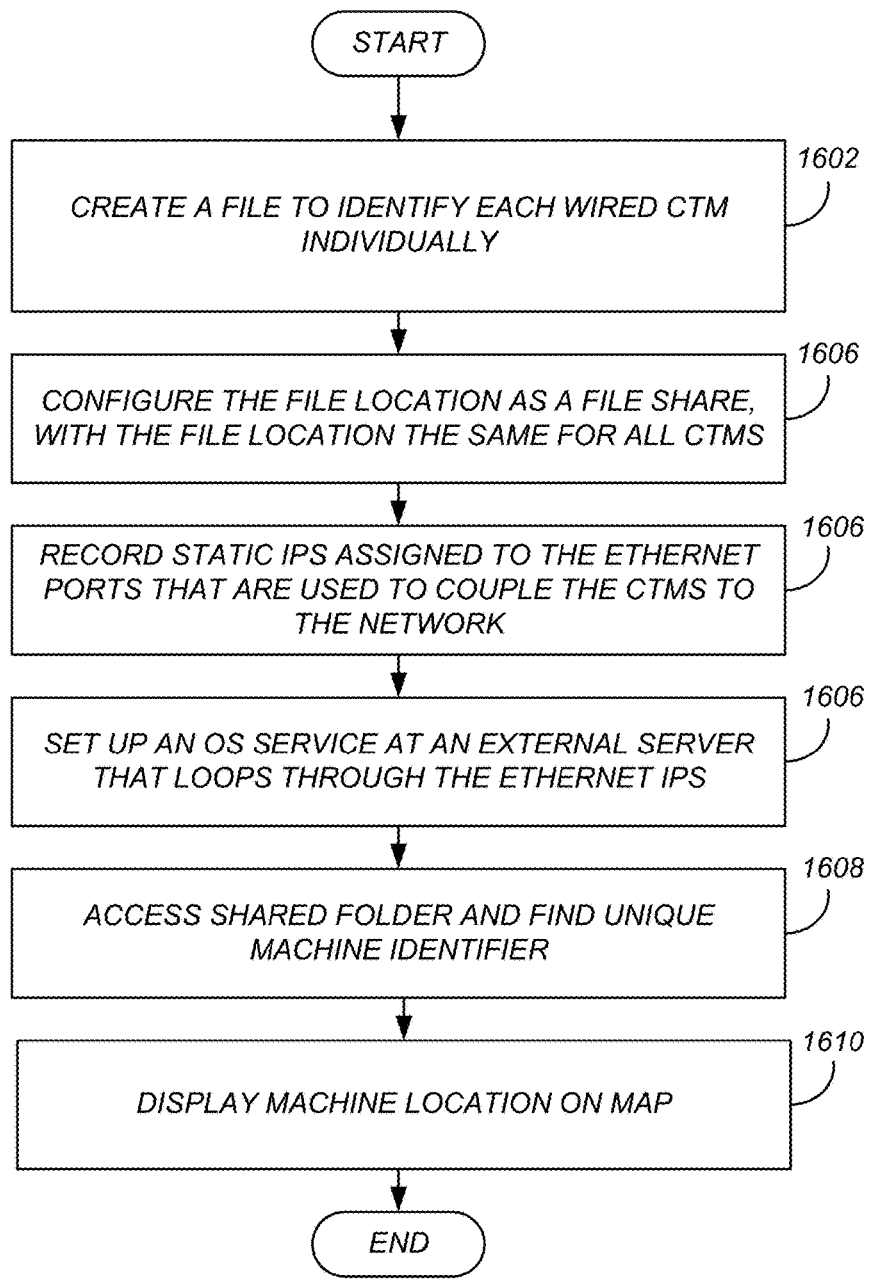
FIGS. 16A and 16B are diagrams presenting illustrative process steps that can be used to cutter tool machines and other elements of the automated production system.
Figure 16B:
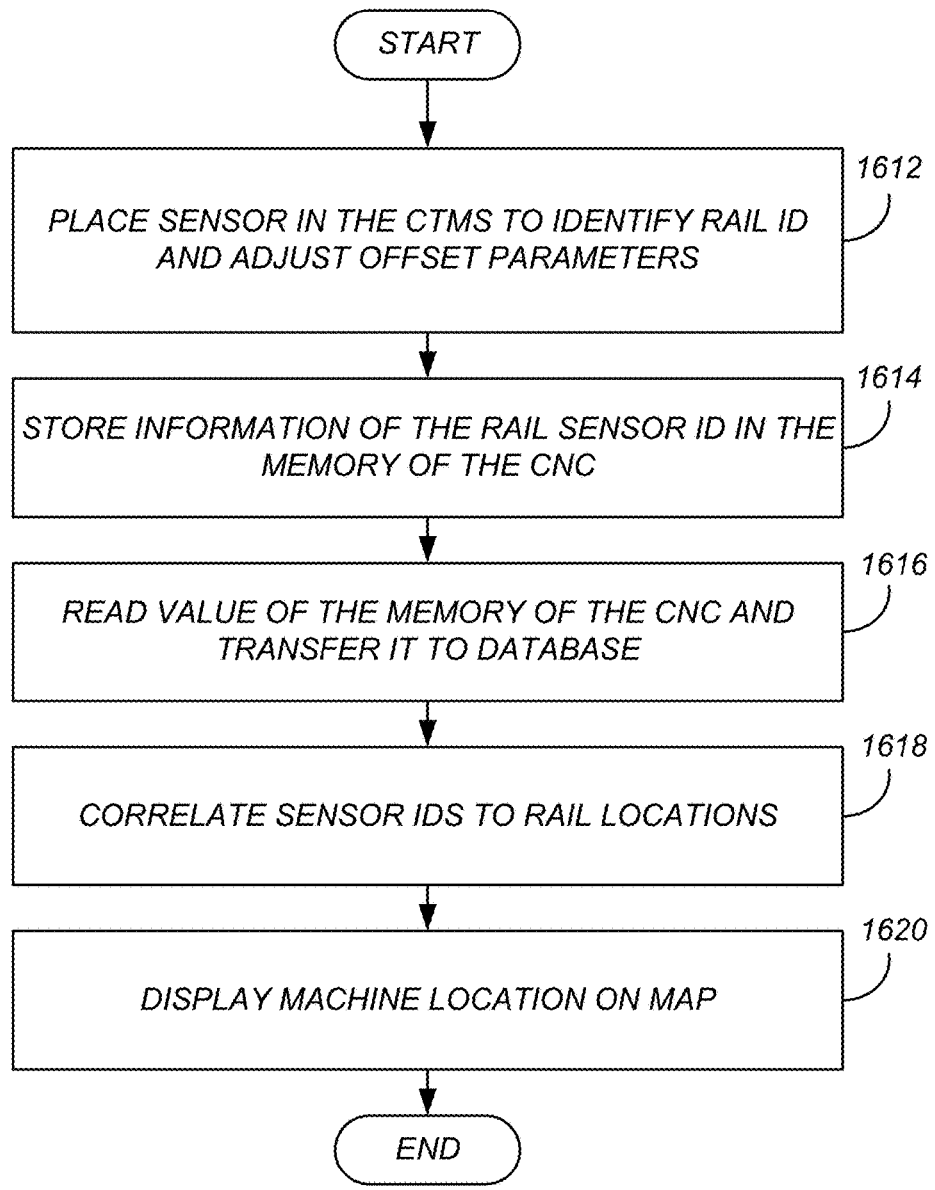

FIGS. 16A and 16B are diagrams presenting illustrative process steps that can be used to CTMs 104 and other elements of the automated production system 100. Such CTMs 104 and other elements include wired CTMs 104 and wireless CTMs 104. FIG. 16A describes how wired CTMs 104 and other elements of the automated production system 100 may be located. In block 1602, a file is created to identify each wired CTM 104 individually. In block 1606, the file location just created is configured as a shared file. The location of the shared file is the same for all machines in the automated production network 100 sought to be located, including the CTMs 104. In block 1606, static IP addresses are assigned to the Ethernet ports that are used to connected the CTMs 104 to the automated production network 100. In block 1610, an operating system service is set up at an external server that loops through all of the Ethernet IP addresses, looking for machines. In block 1608, the shared folder associated with the found IP addresses is accessed to find the CTM 104 identifier number. The machine location is determined from the unique machine identifier and displayed on a map.

FIG. 16B is a diagram describing how wireless CTMs 104 and other machines may be located. The CTMs 104 roll to different positions on rails. In block 1612, a sensor is placed in the CTMs 104 to identify the rail ID and adjust offset parameters accordingly. This determines the location of the wireless CTM 104. In block 1614, the information of the rail sensor ID is stored in a memory of the CNC 212. In block 1616, the value of the rail sensor ID is read from the CNC memory and transferred to the database 110. In block 1618, the sensor IDs are correlated to the rail IDs, and hence, the rail locations of the CNC 212. In block 1620, the CTM 104 locations are displayed on a map.

Hardware Environment

Figure 17:
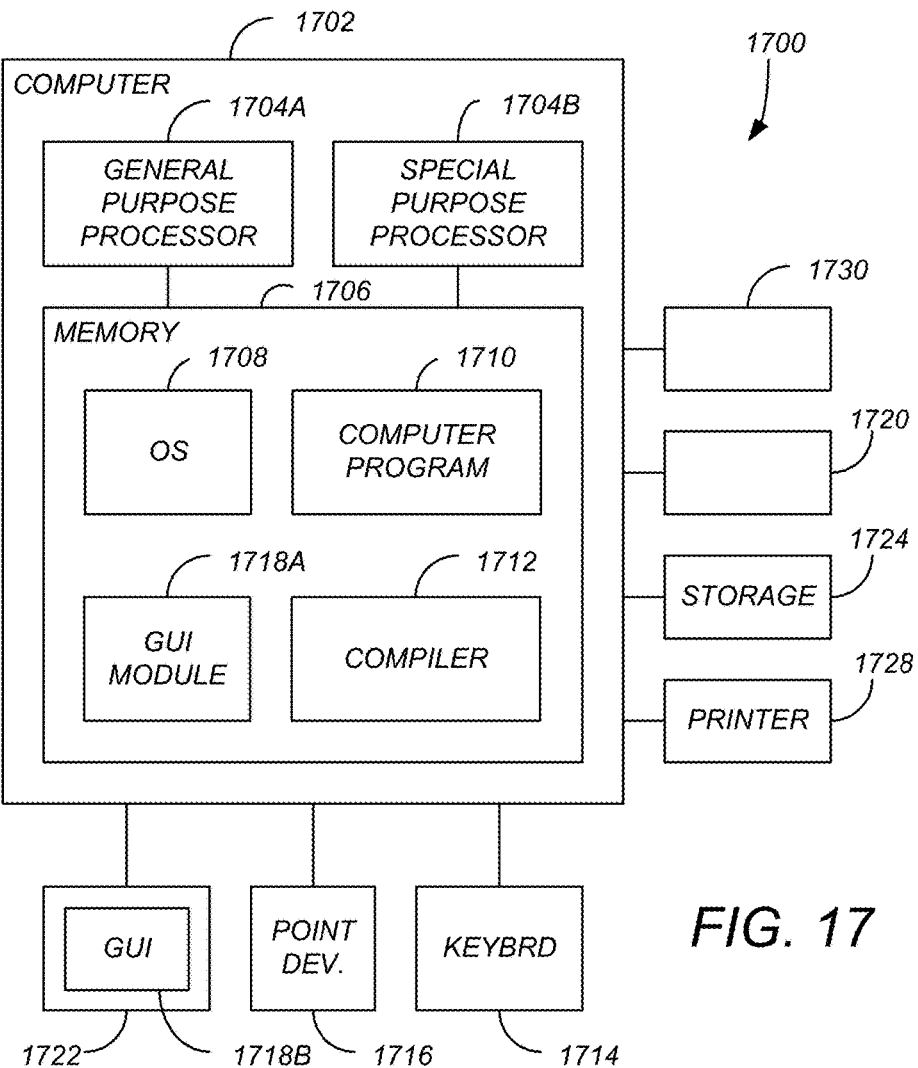
FIG. 17 illustrates an exemplary computer system that could be used to implement processing elements of the above disclosure.

FIG. 17 illustrates an exemplary computer system 1700 that could be used to implement processing elements of the above disclosure, including the CTMs 104, CSMs 106, processing devices 112, database 110, and interface 108. The computer 1702 comprises a processor 1704 and a memory, such as random access memory (RAM) 1706. The computer 1702 is operatively coupled to a display 1722, which presents images such as windows to the user on a graphical user interface 1718B. The computer 1702 may be coupled to other devices, such as a keyboard 1714, a mouse device 1716, a printer, etc. Of course, those skilled in the art will recognize that any combination of the above components, or any number of different components, peripherals, and other devices, may be used with the computer 1702.

Generally, the computer 1702 operates under control of an operating system 1708 stored in the memory 1706, and interfaces with the user to accept inputs and commands and to present results through a graphical user interface (GUI) module 1718A. Although the GUI module 1718B is depicted as a separate module, the instructions performing the GUI functions can be resident or distributed in the operating system 1708, the computer program 1710, or implemented with special purpose memory and processors. The computer 1702 also implements a compiler 1712 which allows an application program 1710 written in a programming language such as COBOL, C++, FORTRAN, or other language to be translated into processor 1704 readable code. After completion, the application 1710 accesses and manipulates data stored in the memory 1706 of the computer 1702 using the relationships and logic that was generated using the compiler 1712. The computer 1702 also optionally comprises an external communication device such as a modem, satellite link, Ethernet card, or other device for communicating with other computers.

In one embodiment, instructions implementing the operating system 1708, the computer program 1710, and the compiler 1712 are tangibly embodied in a computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of instructions which, when read and executed by the computer 1702, causes the computer 1702 to perform the operations herein described. Computer program 1710 and/or operating instructions may also be tangibly embodied in memory 1706 and/or data communications devices 1730, thereby making a computer program product or article of manufacture. As such, the terms "article of manufacture," "program storage device" and "computer program product"

as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of cutting at least one of a plurality of features in a workpiece with at least one of a plurality of cutting tools controlled by at least one of a plurality of cutting tool machines, comprising:
    receiving process information describing cutting parameters for the at least one feature from the at least one of the cutting tool machines;
    retrieving predicted cutting tool wear information relating a predicted cutting tool wear value for the one of the plurality of cutting tools to the cutting parameters;
    retrieving cutting tool information comprising measured cutting tool wear information for the one of the plurality of cutting tools, the measured cutting tool wear information describing a temporally previous measured cutting tool wear value for the cutting tool, wherein the cutting tool information further comprises cutting tool tracking information, the cutting tool tracking information comprising:
        an identifier of the cutting tool;
        a physical location of the cutting tool;
        an identifier of each feature cut by the cutting tool including the at least one of the plurality of features; and
        an identifier of the process information describing the cutting parameters used to cut each feature cut by the cutting tool including the at least one of the plurality of features;
    computing a predicted cutting tool wear value for the one of the plurality of cutting tools from the measured cutting tool wear information, the predicted cutting tool wear information and the cutting parameters; and
    cutting the at least one feature according to the computed predicted cutter wear value.

2. The method of claim 1, wherein cutting the at least one feature according to the computed predicted cutter wear comprises:
    comparing the predicted cutting tool wear value to a threshold wear value; and
    selecting another one of the plurality of cutting tools for cutting the feature according to the comparison.

3. The method of claim 2, further comprising:
    measuring wear of the cutting tool after cutting the at least one feature; and
    updating the measured cutting tool wear information of the cutting tool according to the measured wear of the cutting tool after cutting the at least one feature.

4. The method of claim 2, further comprising:
    measuring wear of the cutting tool after cutting the at least one feature; and
    updating the predicted cutting tool wear information relating predicted cutting tool wear to the cutting parameters according to the measured cutting tool wear.

5. The method of claim 2, further comprising:
    measuring wear of the cutting tool after cutting the at least one feature; and
    updating the cutting parameters according to the measured cutting tool wear.

6. The method of claim 5, wherein the cutting parameters for the at least one feature comprises:
    feature information, comprising:
        a location of the at least one feature in the workpiece
        a composition of the workpiece at the location of the at least one feature; and
        a dimension of the at least one feature in the workpiece;
    cutting tool operation information, comprising:
        a cutting tool dimension;
        cutting tool material composition;
        cutting tool speed;
        cutting tool force; and
        cutting tool coolant.

7. The method of claim 1, wherein:
    the process information comprises a numerical control program for controlling the at least one of the plurality of cutting machines;
    the method further comprises:
        pulling the numerical control information describing the cutting parameters for the at least one feature; and
        parsing the numerical control program to extract the cutting parameters for the at least one feature.

8. The method of claim 1, wherein cutting the at least one feature according to the computed predicted cutter wear value comprises:
    cutting the at least one feature according to second process information that accounts for the predicted cutting tool wear value for the one of the plurality of cutting tools.

9. An apparatus for cutting at least one of a plurality of features in a workpiece with at least one of a plurality of cutting tools controlled by at least one of a plurality of cutting tool machines, comprising:
    a processor, communicatively coupled to a memory storing instructions comprising instructions for:
        receiving process information describing cutting parameters for the at least one feature from the at least one of the cutting tool machines;
        retrieving predicted cutting tool wear information relating a predicted cutting tool wear value for the one of the plurality of cutting tools to the cutting parameters;
        retrieving cutting tool information comprising measured cutting tool wear information for the one of the plurality of cutting tools, the measured cutting tool wear information describing a temporally previous measured cutting tool wear value for the cutting tool wherein the cutting tool information further comprises cutting tool tracking information, the cutting tool tracking information comprising:
            identifier of the cutting tool;

physical location of the cutting tool;
an identifier of each feature cut by the cutting tool including the at least one of the plurality of features; and
an identifier of the process information describing the cutting parameters used to cut each feature cut by the cutting tool including the at least one of the plurality of features;
computing a predicted cutting tool wear value for the one of the plurality of cutting tools from the measured cutting tool wear information, the predicted cutting tool wear information and the cutting parameters; and
cutting the at least one feature according to the computed predicted cutter wear value.

10. The apparatus of claim 9, wherein the instructions for cutting the at least one feature according to the computed predicted cutter wear comprise instructions for:
comparing the predicted cutting tool wear value to a threshold wear value; and
selecting another one of the plurality of cutting tools for cutting the feature according to the comparison.

11. The apparatus of claim 10, wherein the instructions further comprise instructions for:
measuring wear of the cutting tool after cutting the at least one feature; and
updating the measured cutting tool wear information of the cutting tool according to the measured wear of the cutting tool after cutting the at least one feature.

12. The apparatus of claim 10, wherein the instructions further comprise instructions for:
measuring wear of the cutting tool after cutting the at least one feature; and
updating the predicted cutting tool wear information relating predicted cutting tool wear to the cutting parameters according to the measured cutting tool wear.

13. The apparatus of claim 10, wherein the instructions further comprise instructions for:
measuring wear of the cutting tool after cutting the at least one feature; and
updating the cutting parameters according to the measured cutting tool wear.

14. The apparatus of claim 9, wherein:
the process information comprises a numerical control program for controlling the at least one of the plurality of cutting machines;
the instructions further comprise instructions for:
pulling the numerical control information describing the cutting parameters for the at least one feature; and
parsing the numerical control program to extract the cutting parameters for the at least one feature.

15. The apparatus of claim 9, wherein the cutting parameters for the at least one feature comprises:
feature information, comprising:
a location of the at least one feature in the workpiece;
a composition of the workpiece at the location of the at least one feature; and
a dimension of the at least one feature in the workpiece;
cutting tool operation information, comprising:
a cutting tool dimension;
cutting tool material composition;
cutting tool speed;
cutting tool force; and
cutting tool coolant.

16. An apparatus for cutting at least one of a plurality of features in a workpiece with at least one of a plurality of cutting tools controlled by at least one of a plurality of cutting tool machines, comprising:
means for receiving process information describing cutting parameters for the at least one feature from the at least one of the cutting tool machines;
means for retrieving predicted cutting tool wear information relating a predicted cutting tool wear value for the one of the plurality of cutting tools to the cutting parameters;
means for retrieving cutting tool information comprising measured cutting tool wear information for the one of the plurality of cutting tools, the measured cutting tool wear information describing a temporally previous measured cutting tool wear value for the cutting tool wherein the cutting tool information further comprises cutting tool tracking information, the cutting tool tracking information comprising:
identifier of the cutting tool;
physical location of the cutting tool;
an identifier of each feature cut by the cutting tool including the at least one of the plurality of features; and
an identifier of the process information describing the cutting parameters used to cut each feature cut by the cutting tool including the at least one of the plurality of features;
means for computing a predicted cutting tool wear value for the one of the plurality of cutting tools from the measured cutting tool wear information, the predicted cutting tool wear information and the cutting parameters; and
means for cutting the at least one feature according to the computed predicted cutter wear value.

17. The apparatus of claim 16, wherein the means for cutting the at least one feature according to the computed predicted cutter wear comprises:
means for comparing the predicted cutting tool wear value to a threshold wear value; and
means for selecting another one of the plurality of cutting tools for cutting the feature according to the comparison.

18. The apparatus of claim 17, further comprising:
means for measuring wear of the cutting tool after cutting the at least one feature; and
means for updating the measured cutting tool wear information of the cutting tool according to the measured wear of the cutting tool after cutting the at least one feature.

19. The apparatus of claim 17, further comprising:
means for measuring wear of the cutting tool after cutting the at least one feature; and
means for updating the predicted cutting tool wear information relating predicted cutting tool wear to the cutting parameters according to the measured cutting tool wear.

* * * * *